United States Patent
Zubas et al.

(10) Patent No.: US 9,483,087 B2
(45) Date of Patent: Nov. 1, 2016

(54) MULTI-ORIENTATION MOBILE DEVICE, COMPUTER-READABLE STORAGE UNIT THEREFOR, AND METHODS FOR USING THE SAME

(71) Applicant: AT&T Intellectual Property I, L.P., Atlanta, GA (US)

(72) Inventors: Michael Zubas, Marietta, GA (US); Kenneth D. Heil, Marietta, GA (US); John E. Lewis, Lawrenceville, GA (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 371 days.

(21) Appl. No.: 14/093,176

(22) Filed: Nov. 29, 2013

(65) Prior Publication Data

US 2015/0153909 A1  Jun. 4, 2015

(51) Int. Cl.
*G06F 3/048* (2013.01)
*G06F 1/16* (2006.01)
*G06F 3/0481* (2013.01)
*G06F 3/0484* (2013.01)
*G06F 3/0482* (2013.01)

(52) U.S. Cl.
CPC ........... *G06F 1/1694* (2013.01); *G06F 3/0481* (2013.01); *G06F 3/0482* (2013.01); *G06F 3/0484* (2013.01); *G06F 3/04842* (2013.01); *G06F 2200/1637* (2013.01)

(58) Field of Classification Search
CPC ............... G06F 3/0482; G06F 3/0484; G06F 3/04842; G06F 3/0481; G06F 9/4443; G06F 3/04847; H04L 67/10
See application file for complete search history.

(56) References Cited

U.S. PATENT DOCUMENTS

| | | | |
|---|---|---|---|
| 5,432,510 | A | 7/1995 | Matthews |
| 5,825,675 | A | 10/1998 | Want et al. |
| 6,882,335 | B2 | 4/2005 | Saarinen |
| 7,379,762 | B2 | 5/2008 | Too et al. |
| 7,656,393 | B2 | 2/2010 | King et al. |
| 8,125,461 | B2 | 2/2012 | Weber et al. |
| 2004/0179042 | A1* | 9/2004 | Bear ............... G06F 3/0238 715/840 |
| 2006/0238517 | A1* | 10/2006 | King ............... G06F 1/1626 345/173 |
| 2007/0152963 | A1 | 7/2007 | Wong et al. |
| 2007/0157095 | A1* | 7/2007 | Bilow ............... G06F 3/0481 715/744 |

(Continued)

FOREIGN PATENT DOCUMENTS

| | | |
|---|---|---|
| CA | 2681291 | 4/2010 |
| CA | 2800335 | 4/2010 |

(Continued)

OTHER PUBLICATIONS

Examiner's annotation of Bilow (US 2007/0157095) 6 pages.*

*Primary Examiner* — Tuyetlien T Tran
*Assistant Examiner* — Jaime Duckworth
(74) *Attorney, Agent, or Firm* — Hartman & Citrin LLC

(57) ABSTRACT

A multi-orientation mobile communication device having a first button positioned at the first side of a device at a first relative positioning with respect to a second button on the first side and a third button positioned at a second side of the body at the first relative positioning with respect to a fourth button positioned on the second side. The device also includes instructions causing a processor to perform operations comprising determining that an orientation of the device has changed and reassigning, responsively, button characteristics based on relative positioning of the first through fourth buttons following the re-orientation.

14 Claims, 29 Drawing Sheets

(56) References Cited

U.S. PATENT DOCUMENTS

| | | | | |
|---|---|---|---|---|
| 2007/0188450 A1* | 8/2007 | Hernandez | ............ | G06F 1/1626 345/158 |
| 2010/0066763 A1* | 3/2010 | MacDougall | ......... | G06F 1/1626 345/656 |
| 2010/0171699 A1 | 7/2010 | Wong et al. | | |
| 2011/0090256 A1 | 4/2011 | Manchester | | |

FOREIGN PATENT DOCUMENTS

| | | |
|---|---|---|
| CA | 2799178 | 6/2013 |
| EP | 0637794 | 3/2003 |
| TW | 201239679 | 10/2012 |
| WO | 2006022713 | 3/2006 |
| WO | 2008027610 | 3/2008 |

* cited by examiner

_MULTI-ORIENTATION MOBILE DEVICE, COMPUTER-READABLE STORAGE UNIT THEREFOR, AND METHODS FOR USING THE SAME_

TECHNICAL FIELD

The present disclosure relates generally to mobile communication devices and, more particularly, to mobile communication devices configured to be used in a similar manner irrespective of device orientation.

BACKGROUND

Mobile communication devices are being made increasingly to facilitate use at multiple device orientations. Most devices, such as smart phones or tablets these days have auto-rotating displays, whereby the device is programmed to, in response to device turning, turn a display by an equal amount and in an opposite direction to the device turning.

User-device interfaces comprise, for most modern mobile communication devices, what can be referred to as soft interfaces and hard interfaces. Soft interfaces include, primarily, the device display and aspects thereof, such as touch sensitive features. Hard interfaces include structural keys or buttons, such as a face button or a side-of-device button. Advanced multi-orientation features concerning at least hard interfaces are needed to complement existing multi-orientation features and enable new multi-orientation device operations.

SUMMARY

The present disclosure relates to a multi-orientation mobile communication device, comprising a body comprising a first side, a second side opposite the first side, a third side extending between the first side and the second side, and a fourth side opposite the third side and also extending between the first side and the second side. The device also includes a first button positioned at the first side of the body at a first relative positioning with respect to a second button positioned also on the first side of the body, the second button positioned at a second relative positioning with respect to the first button, a third button positioned at the second side of the body at the first relative positioning with respect to a fourth button positioned also on the second side of the body, and the fourth button positioned at the second relative positioning with respect to the third button, wherein, when the mobile communication is in an initial orientation, the first side, including the first button and the second button, is in a first user-perspective button area, and the second side, including the third button and the fourth button, is in a second user-perspective button area. The device also includes a processor and a computer-readable storage medium comprising computer-executable instructions that, when executed by the processor, cause the processor to perform operations. The operations comprise (a) associating a first characteristic to the first button based on the first button being, when the mobile communication device is at the initial orientation, positioned in the first user-perspective button area and bearing the first relative positioning with respect to the second button (b) associating a second characteristic to the second button based on the second button being, when the mobile communication device is at the initial orientation, positioned in the first user-perspective button area and bearing the second relative positioning with respect to the first button, (c) associating a third characteristic to the third button based on the third button being, when the mobile communication device is at the initial orientation, positioned in the second user-perspective button area and bearing the first relative positioning with respect to the fourth button, and (d) associating a fourth characteristic to the fourth button based on the fourth button being, when the mobile communication device is at the initial orientation, positioned in the second user-perspective button area and bearing the second relative positioning with respect to the third button. The operations also include (e) determining that an orientation of the mobile communication device has changed from the initial orientation to a new orientation wherein the first side, including the first button and the second button, is in the second user-perspective button area, and the second side, including the third button and the fourth button, is in the first user-perspective button area and (f) reassigning, in response to determining that the orientation has changed to the new orientation, button characteristics, comprising (f)(1) associating the first characteristic to the fourth button based on the fourth button being positioned, upon the mobile communication device arriving at the new orientation, in the first user-perspective button area and bearing the first relative positioning with respect to the third button, (f)(2) associating the second characteristic to the third button based on the third button being positioned, upon the mobile communication device arriving at the new orientation, in the first user-perspective button area and bearing the second relative positioning with respect to the fourth button, (f)(3) associating the third characteristic to the second button based on the second button being positioned, upon the mobile communication device arriving at the new orientation, in the second user-perspective button area and bearing the first relative positioning with respect to the first button, and (f)(4) associating the fourth characteristic to the first button based on the first button being positioned, upon the mobile communication device arriving at the new orientation, in the second user-perspective button area and bearing the second relative positioning with respect to the second button.

In one embodiment, each characteristic includes at least one feature selected from a group consisting of a function and a state.

In one embodiment, the first relative positioning comprises being positioned closer to the third side of the mobile communication device, and the second relative positioning comprises being positioned closer to the fourth side of the mobile communication device.

In one embodiment, the operation of determining that the orientation of the mobile communication device has changed from the initial orientation to the new orientation comprises using input received from an accelerometer.

In one embodiment, the operation of determining that the orientation of the mobile communication device has changed from the initial orientation to the new orientation comprises using input received from a camera component.

In one embodiment, input indicates that a user face is in front of the camera component.

In one embodiment, the mobile communication device further comprises a first device face extending between the first side and the second side and between the third side and the fourth side, and a second device face opposite the first device face, the second device face also extending between the first side and the second side and between the third side and the fourth side, wherein the first device face is open to a device-user direction when the device is at the initial orientation and the second device face is open to the device-user direction when the device is at the new orientation.

In one embodiment, the mobile communication device of claim 1, further comprises a fifth button positioned at the third side of the body at a third relative positioning with respect to a sixth button positioned also on the third side of the body, the sixth button positioned at a fourth relative positioning with respect to the fifth button, a seventh button positioned at the fourth side of the body at the third relative positioning with respect to an eighth button positioned also on the fourth side of the body, and the eighth button positioned at the fourth relative positioning with respect to the seventh button, and when the mobile communication device is at the initial orientation, the third side, including the fifth button and the sixth button, is in the third user-perspective button area, and the fourth side, including the seventh button and the eighth button, is in the fourth user-perspective button area. The operations can further comprise (g) associating a fifth characteristic to the fifth button based on the fifth button being, when the mobile communication device is at the initial orientation, positioned in the third user-perspective button area and bearing the third relative positioning with respect to the sixth button, (h) associating a sixth characteristic to the sixth button based on the sixth button being, when the mobile communication device is at the initial orientation, positioned in the third user-perspective button area and bearing the fourth relative positioning with respect to the fifth button, (i) associating a seventh characteristic to the seventh button based on the seventh button being, when the mobile communication device is at the initial orientation, positioned in the fourth user-perspective button area and bearing the third relative positioning with respect to the eighth button, and (j) associating an eighth characteristic to the eighth button based on the eighth button being, when the mobile communication device is at the initial orientation, positioned in the fourth user-perspective button area and bearing the fourth relative positioning with respect to the seventh button. The operation of (f) reassigning, in response to determining that the orientation has changed to the new orientation, button characteristics, can further comprise (f)(5) associating the fifth characteristic to the eighth button based on the eighth button being positioned, upon the mobile communication device arriving at the new orientation, in the third user-perspective button area and bearing the third relative positioning with respect to the seventh button, (f)(6) associating the sixth characteristic to the seventh button based on the seventh button being positioned, upon the mobile communication device arriving at the new orientation, in the first user-perspective button area and bearing the fourth relative positioning with respect to the eighth button, (f)(7) associating the seventh characteristic to the sixth button based on the sixth button being positioned, upon the mobile communication device arriving at the new orientation, in the fourth user-perspective button area and bearing the third relative positioning with respect to the fifth button, and (f)(8) associating the eighth characteristic to the fifth button based on the fifth button being positioned, upon the mobile communication device arriving at the new orientation, in the fourth user-perspective button area and bearing the fourth relative positioning with respect to the sixth button.

In one embodiment, the third relative positioning comprises being positioned closer to the first side of the mobile communication device, and the fourth relative positioning comprises being positioned closer to the second side of the mobile communication device.

In another aspect, the present disclosure relates to a multi-orientation mobile communication device, comprising a body comprising a first side, a second side opposite the first side, a third side extending between the first side and the second side, and a fourth side opposite the third side and also extending between the first side and the second side, a first button positioned at the first side of the body, wherein the first button has a first size, a second button positioned at the first side of the body, wherein the second button has a second size differing from the first size, a third button positioned at the second side of the body, wherein the third button has a third size, and a fourth button positioned at the second side of the body, wherein the fourth button has a fourth size differing from the third size. When the mobile communication is in an initial orientation, the first side, including the first button and the second button, is in a first user-perspective button area, and the second side, including the third button and the fourth button, is in a second user-perspective button area. The device further comprises a processor, a computer-readable storage medium comprising computer-executable instructions that, when executed by the processor, cause the processor to perform operations. The operations comprise associating a first characteristic to the first button based on the first button having the first size and being, when the mobile communication device is at the initial orientation, positioned in the first user-perspective button area, associating a second characteristic to the second button based on the second button having the second size and being, when the mobile communication device is at the initial orientation, positioned in the first user-perspective button area, associating a third characteristic to the third button based on the third button having the third size and being, when the mobile communication device is at the initial orientation, positioned in the second user-perspective button area, associating a fourth characteristic to the fourth button based on the fourth button having the fourth size and being, when the mobile communication device is at the initial orientation, positioned in the second user-perspective button area, determining that an orientation of the mobile communication device has changed from the initial orientation to a new orientation wherein the first side, including the first button and the second button, is in the second user-perspective button area, and the second side, including the third button and the fourth button, is in the first user-perspective button area, and reassigning, in response to determining that the orientation has changed to the new orientation, button characteristics. The reassigning includes associating the first characteristic to the fourth button based on the fourth button having the fourth size and being positioned, upon the mobile communication device arriving at the new orientation, in the first user-perspective button area, associating the second characteristic to the third button based on the third button having the third size and being positioned, upon the mobile communication device arriving at the new orientation, in the first user-perspective button area, associating the third characteristic to the second button based on the second button having the second size and being positioned, upon the mobile communication device arriving at the new orientation, in the second user-perspective button area and bearing the first relative positioning with respect to the first button, and associating the fourth characteristic to the first button based on the first button having the first size and being positioned, upon the mobile communication device arriving at the new orientation, in the second user-perspective button area.

In one embodiment, the first size is equal generally to the third size and the second size is equal generally to the fourth size.

In one embodiment, the operation of determining that the orientation of the mobile communication device has changed from the initial orientation to the new orientation comprises using input received from an accelerometer.

In one embodiment, the operation of determining that the orientation of the mobile communication device has changed from the initial orientation to the new orientation comprises using input received from a camera component.

In one embodiment, the device further comprises a first device face extending between the first side and the second side, and the third side and the fourth side, and a second device face opposite the first device side, the second device face also extending between the first side and the second side, and the third side and the fourth side, and wherein the first device face is open to a device-user direction when the device is at the initial orientation, and the second device face is open to the device-user direction when the device is at the new orientation.

In one embodiment, the mobile communication device further comprises a fifth button positioned at the third side of the body and having a fifth size, a sixth button positioned at the third side and having a sixth size, a seventh button positioned at the third side and having a seventh size, and an eighth button positioned at the third side and having an eighth size. When the mobile communication device is at the initial orientation, the third side, including the fifth button and the sixth button, is in the third user-perspective button area, and the fourth side, including the seventh button and the eighth button, is in the fourth user-perspective button area. The operations further comprise associating a fifth characteristic to the fifth button based on the fifth button having the fifth size and being, when the mobile communication device is at the initial orientation, positioned in the third user-perspective button area, associating a sixth characteristic to the sixth button based on the sixth button having the sixth size and being, when the mobile communication device is at the initial orientation, positioned in the third user-perspective button area, associating a seventh characteristic to the seventh button based on the seventh button having the seventh size and being, when the mobile communication device is at the initial orientation, positioned in the fourth user-perspective button area, and associating an eighth characteristic to the eighth button based on the eighth button having the eighth size and being, when the mobile communication device is at the initial orientation, positioned in the fourth user-perspective button area. The operation of reassigning, in response to determining that the orientation has changed to the new orientation, button characteristics, further comprises associating the fifth characteristic to the eighth button based on the eighth button having the eighth size and being positioned, upon the mobile communication device arriving at the new orientation, in the third user-perspective button area, associating the sixth characteristic to the seventh button based on the seventh button having the seventh size and being positioned, upon the mobile communication device arriving at the new orientation, in the third user-perspective button area, associating the seventh characteristic to the sixth button based on the sixth button having the sixth size and being positioned, upon the mobile communication device arriving at the new orientation, in the fourth user-perspective button area, and associating the eighth characteristic to the fifth button based on the fifth button having the fifth size and being positioned, upon the mobile communication device arriving at the new orientation, in the fourth user-perspective button area.

In one embodiment, the fifth size is equal generally to the seventh size and the sixth size is equal generally to the eighth size.

In one embodiment, the fifth size is equal generally to the first size and the sixth size is equal generally to the second size.

In another aspect of the present technology, a multi-orientation mobile communication device, comprises a body comprising a first side, a second side opposite the first side, a third side extending between the first side and the second side, and a fourth side opposite the third side and also extending between the first side and the second side, a first button positioned at the first side of the body, a second button positioned at the second side of the body, a third button positioned at the third side of the body, a fourth button positioned at the fourth side of the body, wherein, when the mobile communication is in an initial orientation, the first button is positioned in a first user-perspective button area, the second button is positioned in a second user-perspective button area, the third button is positioned in a third user-perspective button area, and the fourth button is positioned in a fourth user-perspective button area, a processor, and a computer-readable storage medium comprising computer-executable instructions that, when executed by the processor, cause the processor to perform operations. The operations comprise associating a first characteristic to the first button based on the first button being, when the mobile communication device is at the initial orientation, positioned in the first user-perspective button area, associating a second characteristic to the second button based on the second button being, when the mobile communication device is at the initial orientation, positioned in the second user-perspective button area, associating a third characteristic to the third button based on the third button being, when the mobile communication device is at the initial orientation, positioned in the third user-perspective button area. associating a fourth characteristic to the fourth button based on the fourth button being, when the mobile communication device is at the initial orientation, positioned in the fourth user-perspective button area, determining that an orientation of the mobile communication device has changed from the initial orientation to a new orientation differing by one-hundred and eighty degrees from the initial orientation, and reassigning, in response to determining that the orientation has changed to the new orientation, button characteristics. The reassigning comprises associating the first characteristic to the second button based on the second button being positioned, upon the mobile communication device arriving at the new orientation, in the first user-perspective button area, associating the second characteristic to the first button based on the first button being positioned, upon the mobile communication device arriving at the new orientation, in the second user-perspective button area, associating the third characteristic to the fourth button based on the fourth button being positioned, upon the mobile communication device arriving at the new orientation, in the third user-perspective button area, and associating the fourth characteristic to the third button based on the third button being positioned, upon the mobile communication device arriving at the new orientation, in the fourth user-perspective button area.

In one embodiment, a first transition of the device connects the first side to the third side, a second transition of the device connects the third side to the second side, a third transition of the device connects the second side to the fourth side, a fourth transition of the device connects the fourth side to the first side, the first button is positioned on the first side proximate the first transition and distal from the fourth transition, the second button is positioned on the second side proximate the third transition and distal from the second transition, the third button is positioned on the third side proximate the second transition and distal from the first transition, and the fourth button is positioned on the fourth side proximate the fourth transition and distal from the third transition.

In one embodiment, the mobile communication device further comprises a fifth button positioned at the first side of the body proximate the first button, a sixth button positioned at the second side of the body proximate the second button, a seventh button positioned at the third side of the body proximate the third button, and an eighth button positioned at the fourth side of the body proximate the fourth button. When the mobile communication is in an initial orientation, the fifth button is positioned in a fifth user-perspective button area adjacent the first user-perspective button area, the sixth button is positioned in a sixth user-perspective button area adjacent the second user-perspective button area, the seventh button is positioned in a seventh user-perspective button area adjacent the third user-perspective button area, and the eighth button is positioned in an eighth user-perspective button area adjacent the fourth user-perspective button area. The operations further comprise associating a fifth characteristic to the fifth button based on the fifth button being, when the mobile communication device is at the initial orientation, positioned in the fifth user-perspective button area, associating a sixth characteristic to the sixth button based on the sixth button being, when the mobile communication device is at the initial orientation, positioned in the sixth user-perspective button area, associating a seventh characteristic to the seventh button based on the seventh button being, when the mobile communication device is at the initial orientation, positioned in the seventh user-perspective button area, and associating an eighth characteristic to the eighth button based on the eighth button being, when the mobile communication device is at the initial orientation, positioned in the eighth user-perspective button area. The operation of reassigning, in response to determining that the orientation has changed to the new orientation, button characteristics, further comprises associating the fifth characteristic to the sixth button based on the sixth button being positioned, upon the mobile communication device arriving at the new orientation, in the fifth user-perspective button area, associating the sixth characteristic to the fifth button based on the fifth button being positioned, upon the mobile communication device arriving at the new orientation, in the sixth user-perspective button area, associating the seventh characteristic to the eighth button based on the eighth button being positioned, upon the mobile communication device arriving at the new orientation, in the seventh user-perspective button area, and associating the eighth characteristic to the seventh button based on the seventh button being positioned, upon the mobile communication device arriving at the new orientation, in the eighth user-perspective button area.

Other aspects of the present technology will be in part apparent and in part pointed out hereinafter.

DETAILED DESCRIPTION

Figure 1:
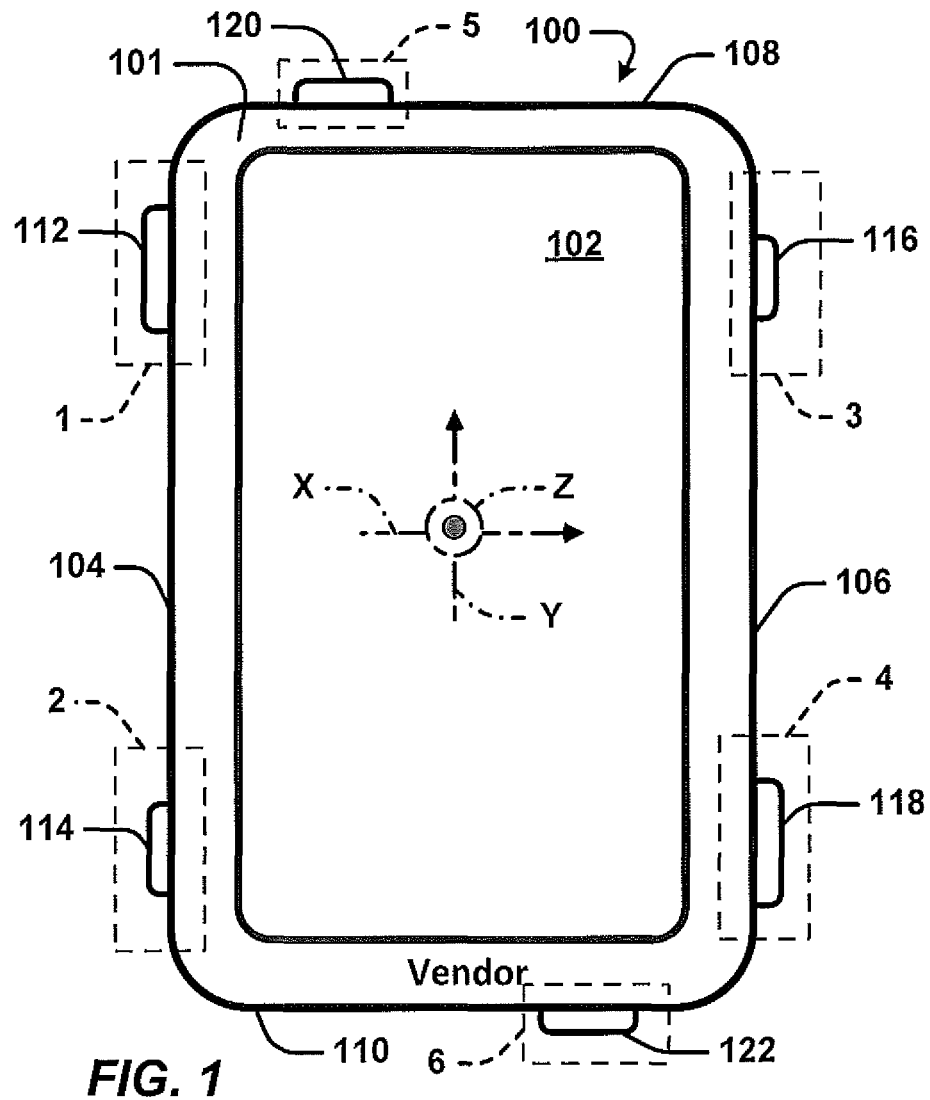
FIG. 1 illustrates a first example mobile communication device at a first orientation.

As required, detailed embodiments of the present disclosure are disclosed herein. The disclosed embodiments are merely examples that may be embodied in various and alternative forms, and combinations thereof. As used herein, for example, for instance, illustrative, and similar terms, refer expansively to embodiments that serve as an illustration, specimen, model or pattern.

The figures are not necessarily to scale and some features may be exaggerated or minimized, such as to show details of particular components. In some instances, well-known components, systems, materials or methods have not been described in detail in order to avoid obscuring the present disclosure.

Therefore, specific structural and functional details disclosed herein are not to be interpreted as limiting, but merely as a basis for the claims and as a representative basis for teaching one skilled in the art to employ the present disclosure in various ways.

While the description includes a general context of computer-executable instructions, the present disclosure can also be implemented in combination with other program modules and/or as a combination of hardware and software. The term application, or variants thereof, is used expansively herein to include routines, program modules, programs, components, data structures, algorithms, and the like.

Applications can be implemented on various system configurations, including single-processor or multiprocessor systems, minicomputers, mainframe computers, personal computers, hand-held computing devices, microprocessor-based, programmable consumer electronics, combinations thereof, and the like.

Overview of the Disclosure

In various embodiments, the present disclosure describes unique user-interface features for mobile communication devices. Example devices include smart phones, personal data assistants, tablets, the like and other handheld electronic devices.

The interface features include button arrangements configured to enable intuitive use of the device irrespective of device orientation—e.g., whether the device is positioned in a first or second of at least two device orientations. Each button arrangement includes or is connected to circuitry and controls automatically reassigning, or remapping, functionality assigned to the buttons based on device orientation. The functionality can include pre-set operations and/or an operation state, such as an active, enabled, disabled, or inactive state.

In one embodiment, the orientations include a first orientation and a second orientation flipped from the first orientation—i.e., flipped 180° from 'front' to 'back.' In another embodiment, the orientations include a first orientation and a second orientation turned 180° from the first orientation—i.e., turned to change an initially up side to down.

References herein, including visually or schematically in the figures, to terminology such as up-side up or up-side down, front, back, first side, second side, e.g., do not insinuate that the devices have any preferred or primary orientation, side, face, etc. These or like terminology is at times used to facilitate description of concepts of the various embodiments, and not in a limiting sense.

The button arrangement in one embodiment includes left and right buttons for which function assignments and/or states (enabled/disabled, active/inactive) are switched automatically when the device is flipped. Flipping can include, e.g., turning the device 180° from 'front' (face) to 'back' (face). In these assignments, function and/or states are associated with positioning of the buttons on the device. For instance, a function assigned to a button starting at upper right and ending after device rotation of 180° at lower left will be swapped with a function assigned to a corresponding, or counterpart, button starting at lower left and ending after device rotation at the upper right. In a particular one of these embodiments, there are at least two first side-of-device buttons and a corresponding at least two opposite side-of-device buttons.

The button arrangement in some embodiments includes two or more buttons on the right of the device and two or more corresponding buttons on the left of the device. In these cases, function mapping, or assignments, is associated with relative positioning of the buttons—e.g., whether each button ends up being a top or bottom of two buttons after a rotation, irrespective of position of the buttons along the sides, after the rotation. In a particular one of these embodiments, at least one button is sized to match a size of a corresponding, or counterpart, button at an opposite position (e.g., opposite with respect to the Y and or X axes) of the device. The sizes match so that upon handset rotation, the same size buttons ends up in the same location.

The button arrangement in one embodiment includes two or more buttons on the right of the device and two or more corresponding buttons on the left of the device, wherein (i) a first of the buttons is sized and/or shaped differently than a second button at the same area (e.g., side) of the device, (ii) a third button at an opposite area (e.g., side) of the device matches the first button, and (iii) a fourth button at the area (e.g., side) of the third button matches the second button, whereby function and/or state assignments are associated with relative size and/or shape of the buttons.

The button arrangement in one embodiment includes left and right buttons for which function assignments or mappings are switched automatically when the device is turned 180°—i.e., turned to change an initially upside to down and vice versa.

While hard, or structural, side-of-device and top-of-device buttons are described and illustrated primarily herein, the present technology is not limited to including these button types. One or more of the buttons or keys may, e.g., be positioned instead on a face of the device. And one or more of the buttons can also or instead include soft and/or include 'soft' buttons, such as a button(s) presented via a primary device display screen, via a frame around such screen, via a side of device visual representation, a top-of-device visual representation, and/or virtual buttons in these areas that are not communicated expressly to a user by visual representation.

Example characteristics linked to any button selectively can include, as mentioned, a state (e.g., activate/deactive or enabled/disabled) associated with the button. The functions can include any of camera shutter control, device volume up/down, and on-device movement functions, such as movement of a cursor, selector, or other on-screen control, such as scrolling, moving laterally, or otherwise.

Functions mapped to buttons selectively can also include any of item/soft-key selection, mute, zoom in/out, search, power on/off, home, menu, back, search, call, end call, and media control, such as media record, stop record, media play, media pause, media stop, media next, media previous, media rewind, and media fast forward. Example media includes audio and video.

The functions can also include changing applications, starting or closing an application, browsing controls (refresh, forward, back, etc.), screen lock/unlock, key or button lock/unlock, highlight, color, draw or otherwise mark, the like, and any others.

Implementing any combination of the characteristics described, including button arrangements, button functions, and automatic function reassignment operations, allows intuitive use of the devices, irrespective of whether the device is positioned in a first or second of at least two device orientations.

In these ways, after a user, who has become familiar with a particular button arrangement, with the device in a first orientation, has rotated the handset to a second orientation, functions are re-mapped to the buttons matching the reorientation so that the user can use the buttons directed in generally the same manner familiar with.

The user can become accustomed comfortably with button assignments and their being generally identical no matter how the device is oriented amongst the two or more select orientations.

Ancillary benefits include allowing a user to perform functions irrespective of how the device is held. For instance, a button disposition (e.g., a certain position of the button relative to the user, relative to an adjacent button, a certain shape and/or size of the button, and/or whether it is positioned in a certain relative manner to an adjacent button, etc.) will control the camera shutter whether the device is in a first orientation or a second orientation. In another implementation, a user picking up a device while in the dark, without looking at the device, or otherwise holding the device so that it ends up in any of the covered orientations, can adjust volume or initiate other operations without needing to determine whether the device is oriented in one way or another.

The user need not turn the device to move buttons to a certain position that the user is accustomed to, or to have to calculate which buttons perform which functions when the buttons or not in the positioned accustomed to.

Devices configured according to the present technology can be described using any of a wide variety of terminology, such as ubiquitous mobile communication device, ubiquitous wireless communication device, ambiguous mobile communication device, ambiguous wireless communication device, the like, or other.

Each embodiment described herein can be associated with a deactivation option whereby a user can select the option to lock some or all of the buttons assignments. When the option is selected, the state/function assignments for the buttons selected for being locked, e.g., all of the buttons, will not change when the device is rotated. A program or application controlling the auto-reassignment (or, auto-remapping or auto re-linking) operations can present the user with an interface by which the user can identify that she wants the auto-assignment operation turned off for all buttons, or for any buttons presented by way of the interface and selected by the user for being locked.

Figure 2:
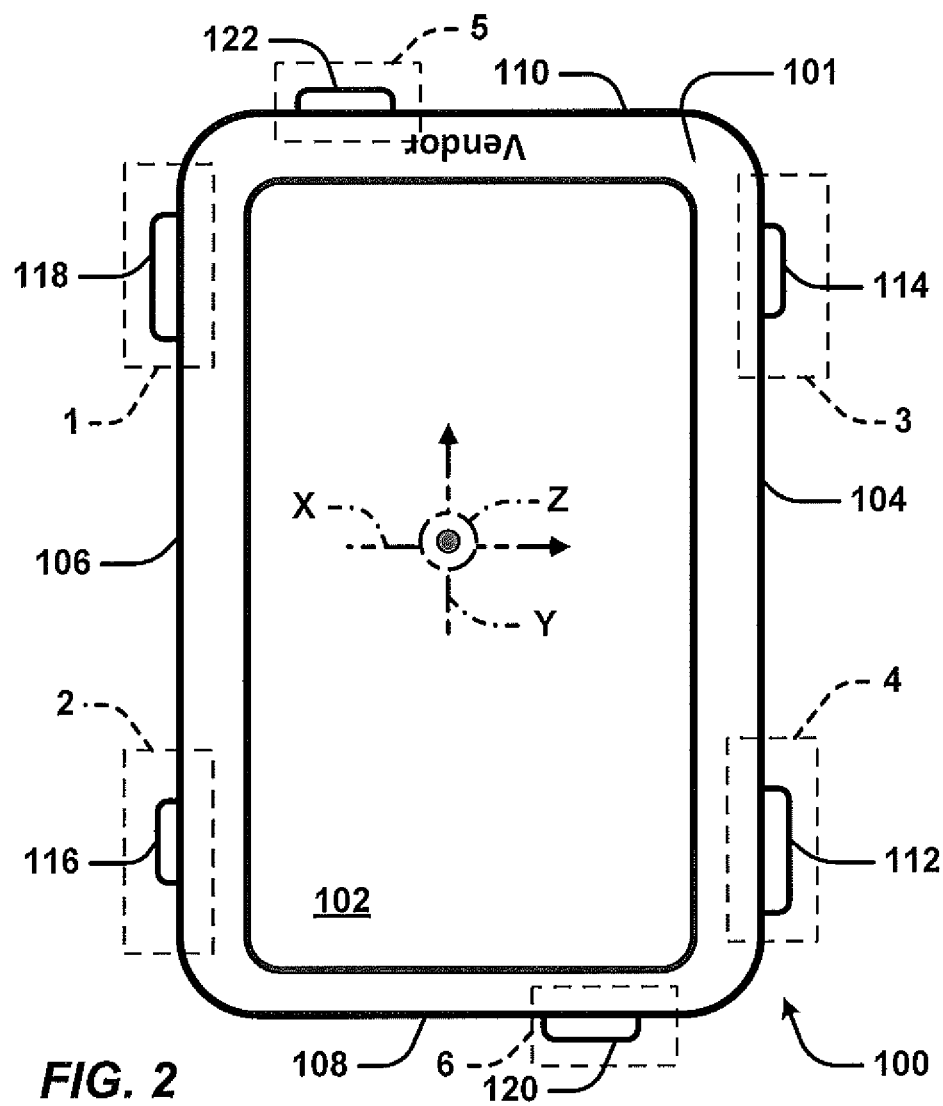
FIG. 2 illustrates the first example mobile communication device at a second orientation, being rotated 180° from the first orientation.

First Example Mobile Communication Device—FIGS. 1 and 2

Now turning to the figures, and more particularly the first figure, FIG. 1 illustrates a first example mobile communication device 100 oriented at a first orientation. FIG. 2 shows the same device 100 at a second orientation, rotated 180° from the first orientation.

Device orientation and change in orientation are described at times herein with respect to a three-axis reference frame used consistently in each of the device figures, FIGS. 1-27. The reference frame includes X, Y, and Z axes, as labeled in the figures, and represents a user perspective. Matching the user perspective, the reference frame remains the same in each view, no matter how the mobile device is oriented. While the reference frames are shown in the figures over top of the device display screen, the reference frames are not part of the device or being displayed by the screen.

Regarding terminology, the term rotation is used generally herein in connection with turning of the device about the Z-axis. And according to the axis symbol convention used, the Z-axis symbol shown (circle including central dot) indicates that the Z axis is coming out of the page, toward the viewer, or device user. Contrast this with use of the term flipping, referring generally to an 180° turn of the device about the X or Y axis, for instance, or otherwise so that the face facing the user originally ends up facing away from the user after the flip.

By the 180° rotation between FIGS. 1 and 2, then, the device 100 is turned about the Z axis so that the portion of the device that was on one side of (e.g., above) the X axis ends up on the other side of (e.g., below) the X axis, and the portion of the device that was laterally on one side of the Y axis ends up on the other lateral side of the Y axis.

Moreover, are referenced, regarding example orientations shown, the view of the devices in each of FIGS. 1-27 should be considered from the perspective of a user of the device 100. Thus, for the implementation of FIGS. 1 and 2, with there being no rotation about either the X or Y axis in the 180° rotation, the same, original face 102, of the device 100 shown in FIG. 1 remains facing the user after the rotation, as shown in FIG. 1.

With continued reference to FIG. 1, further aspects of the device 100 are described. The device 100 includes a display screen 102, such as a touch-sensitive display.

The device includes a first side 104 (e.g., left side) opposite a second side 106 (e.g., right side), and a third side 108 (e.g., top), opposite a fourth side 110 (e.g., bottom). The sides may be edges of the device, as illustrated schematically, in the two dimensions shown.

Two first buttons 112, 114 are positioned on, at, or adjacent the first side 104. The buttons 112, 114 can be said to be located in first and second user-perspective button areas (UPBAs) 1, 2, respectively.

Second two buttons 116, 118 are positioned on, at, or adjacent the second side 106, in third and fourth UPBAs 3 and 4, respectively. The third and fourth sides 108, 110 include buttons 120, 122 as well, in fifth and sixth UPBAs 5 and 6, respectively.

Each of the buttons 112, 114, 116, 118, 120, 122 is associated in software of the device 100 with a first assigned state and/or function corresponding to the first orientation for the device 100 shown in FIG. 1. Each button is then linked with other states and/or functions in association with other device orientations.

As an example, the first button 112 can be active and enabled (state) for a camera function when the device 100 is in the first orientation (FIG. 1). In one embodiment, a first press of the button 112 activates a camera application of the device 100, and a second press of the same button 112 causes the camera application to take a picture using device camera hardware. In another embodiment, the camera application can be also, or instead, opened in another manner, such as by selecting on the display screen 102 an identifier (e.g., icon; not shown in detail) for a camera application.

As an example state/function for the second button 114, when the device 100 is in the first orientation (FIG. 1), is an inactive, or unassigned, state. An inactive state can be distinguished from a disabled state in that an inactive state is not associated with any function—e.g., the button has no assigned function, while a disabled state can be used to describe a button having an assigned function that is not, in the device software, enabled at the time to function. In either case, a simple press of the button does not result in any device activity. In a contemplated embodiment, holding down, for a period of time (e.g., two seconds), a button disabled enables the button for the corresponding function.

Example state/functions for the third and fourth buttons 116, 118, when the device 100 is in the first orientation (FIG. 1), are volume up and volume down, respectively. In some embodiments, the program regarding which volume is controlled by the buttons 116, 118 depends on a mode of the device 100—e.g., which program or application is open at the time. The software of the device 100 could be programmed so that if the phone is idle, with no program or application being used actively by the user, then pressing the buttons 116, 118 would cause a device ringer volume to increase or decrease accordingly. During a phone call, pressing the buttons 116, 118 would adjust the voice level-to-user volume, and during use of a media program, such as while playing or pausing a video or audio file, pressing the buttons 116, 118 would adjust the media playback volume.

An example state/function for the fifth button 120 is active and enabled for screen lock/unlock (regular, short press) and device power on/off (long press).

An example state/function for the sixth button 122 is active and enabled for escape (ESC), back, or home depending, e.g., on the program or application open and perhaps also based on a screen, level, or other location within the program that is active when the button at the sixth UPBA 6 is selected.

These mentioned states and functions are only example first-through-sixth states/functions correspondingly assigned respectively to the buttons 112, 114, 116, 118, 120, 122 of the device 100 when the device is in the first orientation shown in FIG. 1.

As provided, FIG. 2 illustrates the first example mobile communication device 100 in a second orientation reached by, e.g., turning, or rotating the device 100, from the first orientation of FIG. 1, by 180° in either direction, clockwise (CW) or counterclockwise (CCW), about the Z axis.

As mentioned above, and described more below in connection with the illustrative device 2800 of FIG. 28 and the embodiments of the method 2900 of FIG. 29, when the device is re-oriented, the device software receives an indication from at least one device component advising of the re-orientation and, in response to the re-orientation indication, re-assigns states/functions assigned to the device buttons 112, 114, 116, 118, 120, 122.

The at least one device component in some embodiments includes one or both of an accelerometer or a visual sensor, such as a camera, or a light sensor. The indication advising of the reorientation can include, e.g., an amount and direction of orientation change and/or a resulting orientation.

In a contemplated embodiment in which a camera or other visual sensor is used, the communication device is configured to determine an instant orientation of the device, and so changes to device orientation, based on physical characteristics (e.g., light patterns) collected by the sensor. In a particular implementation, for example, the device is configured to recognize when a camera (e.g., a first of two device cameras) is facing a user, such as by recognizing a user face in close proximity to the camera, and in some cases also directional indications, such as which direction is a top of a users head (by detecting, e.g., where eyes are with respect to a mouth or chin, and/or by detecting a top of the head, etc.). The processor, executing the device software can determine based on such data that the device is in a certain orientation—e.g., that of FIG. 1 turned 90° or 180° degrees from the FIG. 1 orientation, or flipped from any of these orientations.

The re-assignment of button states/functions is performed so that statuses/functions associated with user-perspective button locations or areas (UPBAs) with respect to the device (e.g., upper right, upper left, lower left, etc.) from the user's perspective (e.g., user's view) are kept associated with the same locations (e.g., upper right, upper left, lower left, etc.) even after device reorientation.

Thus, for instance, the active volume up/down functions associated with the two buttons 116, 118, which start off on the right side 106 of the device 100 from the user's perspective when the device 100 is in the first orientation (FIG. 1; UPBAs 3 and 4), are reassigned, with the 180° rotation, to the two buttons 112, 114 that start on the left side and end up on the right side 104 of the device 100 from the user's perspective when the device 100 is in the second orientation (FIG. 2; UPBAs 3 and 4).

In other words, the states/functions assigned originally to buttons 116, 118 are associated in the device software with the third and fourth UPBAs 3, 4, and so are assigned to buttons 112, 114 when those buttons 112, 114 are moved to the third and fourth UPBAs 3, 4.

In the same manner, the enabled camera function(s) and inactive state associated with the two buttons 112, 114 that start on the left side 104 of the device 100 from the user's perspective when the device 100 is in the first orientation (FIG. 1; UPBAs 1 and 2), are reassigned, with the 180° rotation, to the two buttons 116, 118 that end up on the left side 106 of the device 100 from the user's perspective when the device 100 is in the second orientation (FIG. 2; UPBAs 1 and 2).

So again, it can be said that first and second states/functions assigned originally to buttons 112, 114 are associated in the device software with the first and second UPBAs 1, 2, respectively and so are assigned to buttons 116, 118 when those buttons 116, 118 are moved to the first and second UPBAs 1, 2, respectively.

And, regarding the fifth button 120, then, the active and enabled screen lock/unlock (regular, short press) and device power on/off (long press) functions associated with the button 120 that started on the top side 108 of the device 100 from the user's perspective when the device 100 is in the first orientation (FIG. 1; UPBA 5), is reassigned, with the 180° rotation, to the button 122 that ends up on the top of the device 100 from the user's perspective when the device 100 is in the second orientation (FIG. 2; UPBA 5).

Thus, the state/function assigned originally to the fifth button 120 is associated in the device software with the fifth UPBA 5, and so is assigned to the sixth button 122 when that button 122 is moved to the fifth UPBA 5.

Regarding the sixth button 122, then, the active and enabled escape/back/home functions associated with the button 122, starting on the bottom side 110 of the device 100 from the user's perspective when the device 100 is in the first orientation (FIG. 1; UPBA 5), is reassigned, with the 180° rotation, to the button 120 that ends up on the bottom of the device 100 from the user's perspective when the device 100 is in the second orientation (FIG. 2; UPBA 6). Thus, the state/function assigned originally to the sixth button 122 is associated in the device software with the sixth UPBA 6, and so is assigned to the fifth button 120 when that button 120 is moved to the sixth UPBA 6.

As mentioned, the device physical configuration and arrangement and programming allow a user to initiate desired functionality by pressing one or more buttons that are positioned in an area (e.g., UPBA) that the user has become accustomed to being associated with the desired functionality. A user picking up the device 100 while in the dark, or without looking at the device, or otherwise holding the device so that it ends up in any of various orientations, can initiate desired functionality, e.g., adjust volume (UPBA 3 and 4), or lock/unlock the device (UPBA 5, regular, short press), without having to determine which orientation the device 100 is in.

Figure 3:
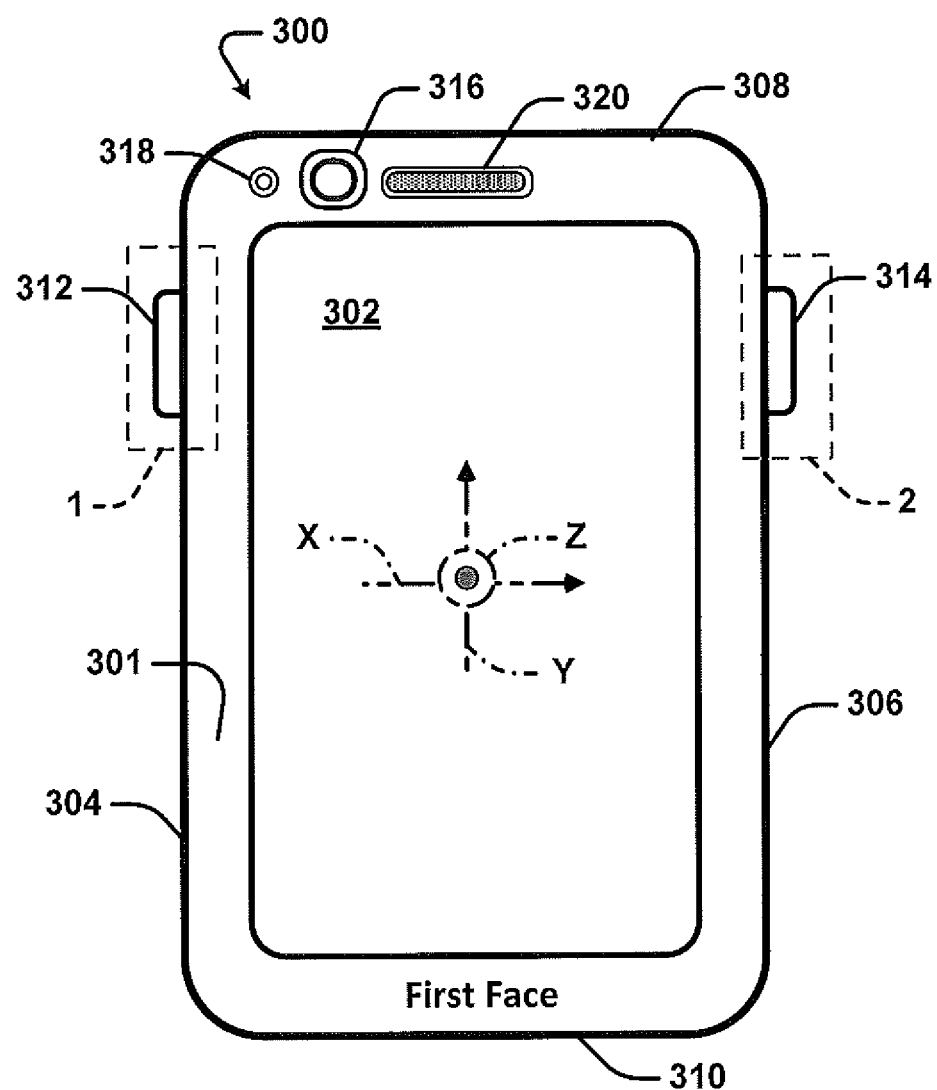
FIG. 3 illustrates a second example mobile communication device at a first orientation.
Figure 4:
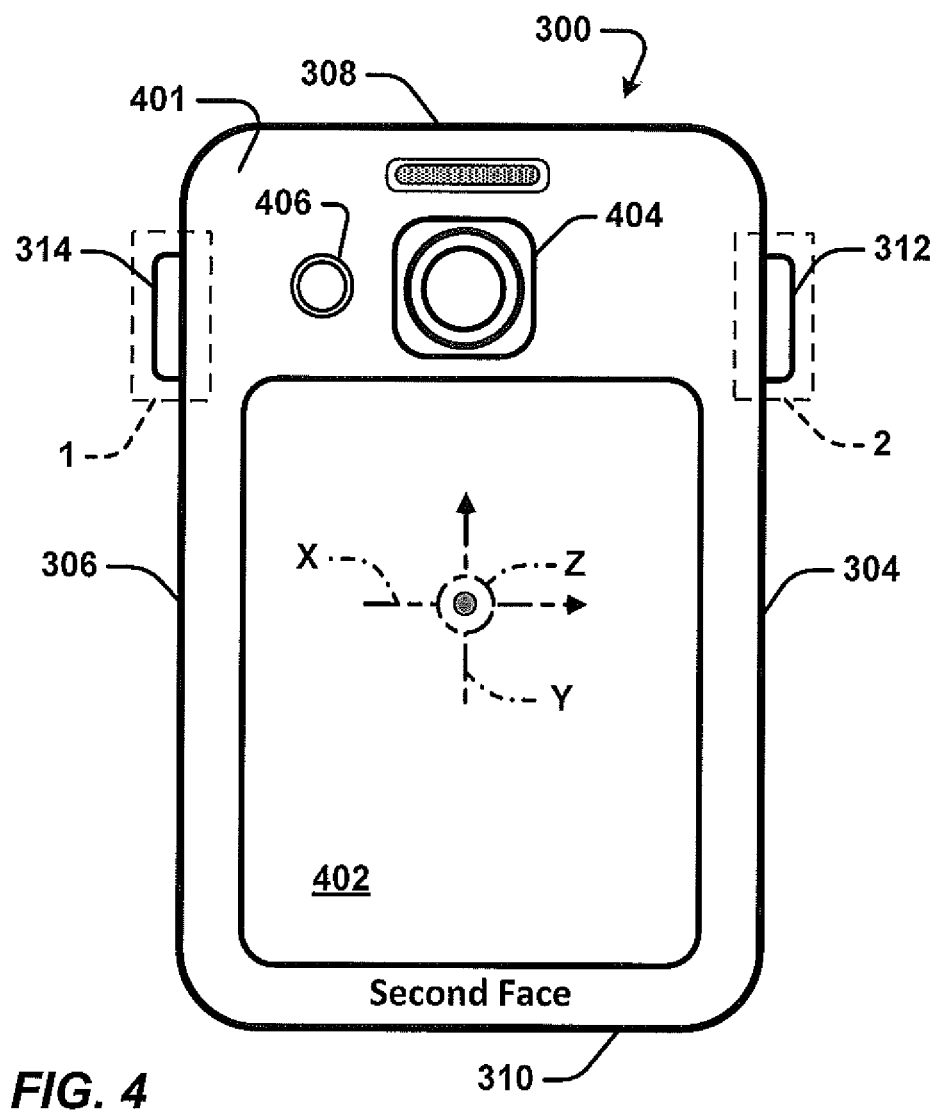
FIG. 4 illustrates the second example mobile communication device at a second orientation, being flipped 180° from the first orientation of FIG. 3.

Second Example Mobile Communication Device—FIGS. 3 and 4

Turning to the next figures, FIG. 3 illustrates a second example mobile communication device 300 oriented at a first orientation, and FIG. 4 illustrates the device 300 at a second orientation, being flipped 180° from the first orientation of FIG. 3. The same user-perspective reference frame (X, Y, and Z axes) used for the first two figures is shown in these figures.

By the 180° flip between FIGS. 3 and 4, the device 300 is turned about, e.g., the Y axis so that a first face 301 of the device facing the user initially ends up facing away from the user after the 180° flip, and a second face 401 of the device 300 facing away from the user initially ends up facing the user after the flip.

Like the first device 100, the second device 300 includes a display screen 302, such as a touch-sensitive display at a first side 301, a first side 304 opposite a second side 306 and a third side, or top 308, opposite a fourth side, or bottom 310, as shown in FIG. 3. The device 300 can also include a display screen 402 at the second side 401.

A first button 312 is positioned on, at, or adjacent the first side 304, at a first user-perspective button areas (UPBAs) 1. A second button 314 is positioned on, at, or adjacent the second side 306, at the second UPBA 2.

Each of the buttons 312, 314 is associated in software of the device 300 with a first assigned state and/or function corresponding to the first orientation for the device 300 shown in FIG. 3. Each of the buttons 312, 314 is also associated in software of the device 300 with a second assigned state and/or function corresponding to the second orientation for the device 300 shown in FIG. 4. Each button 312, 314 may be linked as well with additional states and/or functions in association with other device orientations.

As an example, the first button 312, when the device 300 is in the first orientation (FIG. 3), can be active and enabled (state) to turn a camera program or application on or off when the device is in the first orientation. An example state/function for the second button 314, when the device 300 is in the first orientation (FIG. 3), can include being active and enabled (state) to control a device camera shutter, or otherwise to initiate taking of a photo using the camera.

Again, the aforesaid states and functions for the device 300 are only illustrative first states and functions, corresponding to the first orientation shown in FIG. 3, for the buttons 312, 314, and so corresponding to the first and second UPBAs 1, 2.

FIG. 4 shows the second example mobile communication device 300 in a second orientation reached by flipping, or turning, the device 300, from the first orientation of FIG. 3, by 180° in either direction (clockwise (CW) or counter-clockwise (CCW)) about, e.g., the Y axis.

As mentioned above, and described further below in connection with the illustrative device 2800 of FIG. 28 and the embodiments of the method 2900 of FIG. 29, when the device is re-oriented, the device software receives an indication from at least one device component (e.g., accelerometer, camera, etc.) advising of the re-orientation and, in response to the re-orientation indication, re-assigns states/functions assigned to the buttons 312, 314.

The state/function assigned originally to the first button 312 is associated in the device software with the first UPBA 1, and so is assigned to the second button 314 when that button 314 is moved to the first UPBA 1.

And the state/function assigned originally to the second button 314 is associated in the device software with the second UPBA 2, and so is assigned to the first button 312 when that button 312 is moved to the second UPBA 2.

Again, benefits of the device physical configuration and arrangement and programming allow a user to initiate desired functionality by pressing one or more buttons that are positioned in an area (e.g., UPBA) that the user has become accustomed to being associated with the desired functionality. So, again, a user picking up the device 100 while in the dark, or without looking at the device, or otherwise holding the device so that it ends up in any of the covered orientations, can initiate desired functionality, e.g., opening or closing a camera program or application (UPBA 1), or initiating taking of a picture (UPBA 2), without having to find the button(s) they would use before the orientation, which may have moved in a re-orientation, and without having to orient the device 300 to a home or primary orientation.

Figure 5:
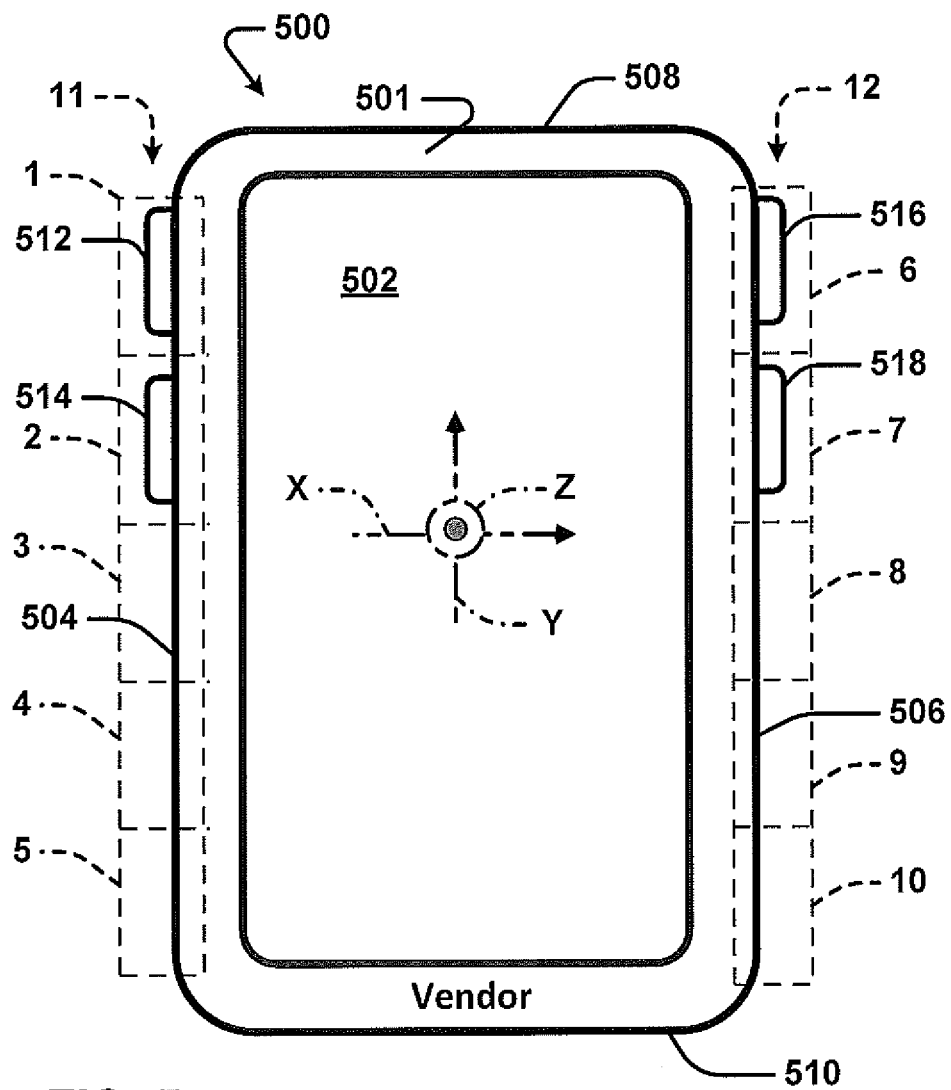
FIG. 5 illustrates a third example mobile communication device at a first orientation.
Figure 6:
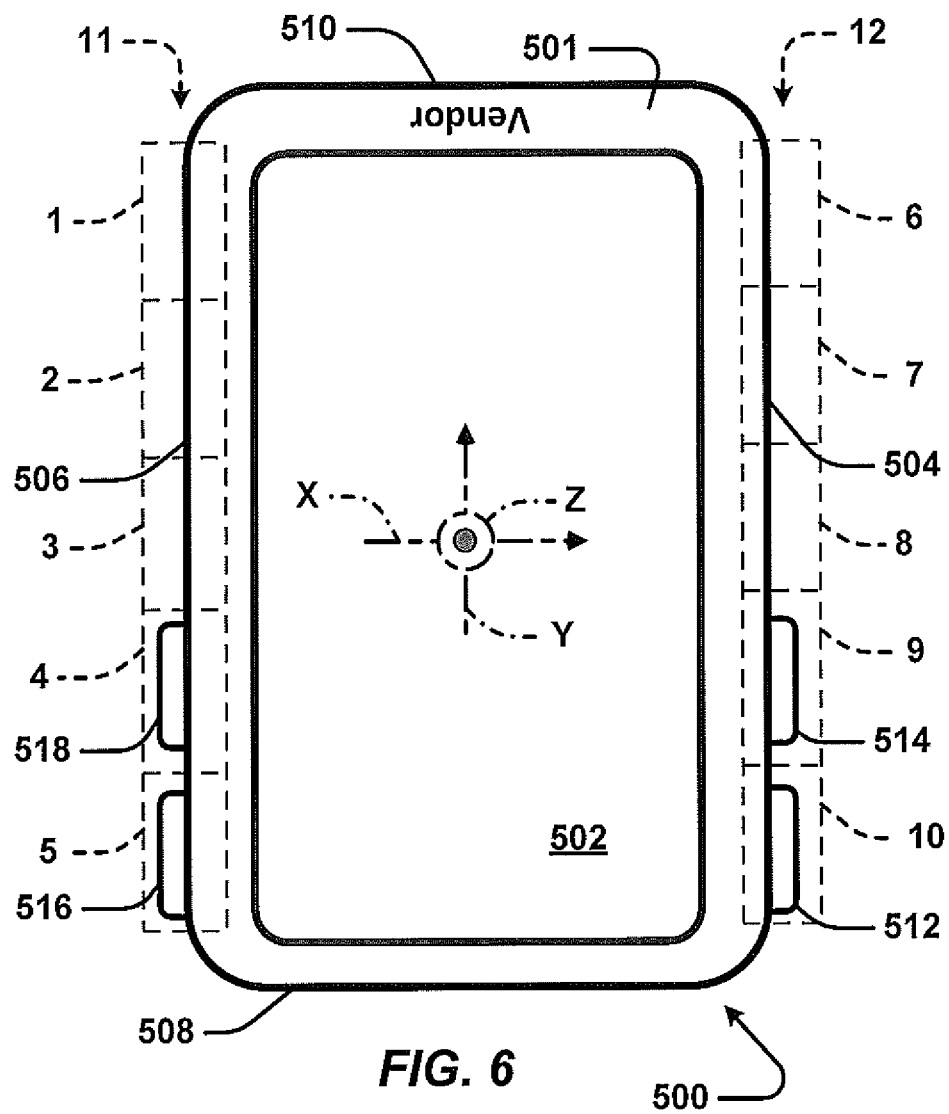
FIG. 6 illustrates the third example mobile communication device at a second orientation, being rotated 180° from the first orientation of FIG. 5.

Third Example Mobile Communication Device—FIGS. 5 and 6

FIG. 5 illustrates a third example mobile communication device 500 at a first orientation, and FIG. 6 illustrates the device 500 at a second orientation, being rotated 180° from the first orientation of FIG. 5. The same user-perspective reference X, Y, and Z axes frame is shown.

By the 180° rotation between FIGS. 5 and 6, the device 500 is turned about the Z axis so that the side 504 initially shown at left ends up at the right, vice versa for the other side 506, the upper and lower sides 508, 510, and the same face 501 faces the user before and after the reorientation.

Like the first two devices 100, 200, the third device 500 includes a display screen 502, such as a touch-sensitive display, at the first face 501. The device 500 can also include a display screen at the second face, which is not shown in connection with the third device 500, but can be like that shown for the back-sides of other example devices 300, 700, etc., such as in FIGS. 4, 9, etc.

A first button 512 is positioned on, at, or adjacent the first side 504, at a first user-perspective button areas (UPBAs) 1. A second button 514 is positioned on, at, or adjacent the first side 504, as well, at a second UPBA 2. Other UPBAs on the first side 504 in FIG. 5 consist of third, fourth, and fifth UPBAs 3, 4, 5.

A third button 516 is positioned on, at, or adjacent the second side 506, at a sixth UPBA 6. A fourth button 518 is positioned on, at, or adjacent the second side 506, as well, at a seventh UPBA 7. Other UPBAs on the second side 506 in FIG. 6 consist of eighth, ninth, and tenth UPBAs 8, 9, 10.

Each of the buttons 512, 514, 516, 518 of the present example device 500 is associated in software of the device 500 with a first assigned state and/or function corresponding to position of the button 512, 514, 516, 518 in the first orientation of FIG. 5.

Contrary to the embodiments of FIGS. 1-4, wherein button-state/function assignment was linked in the software to location of the button (e.g., into which UPBA the button ended up in), in the embodiment of FIGS. 5 and 6, the button-state/function assignments are linked to relative positioning of each button to a device characteristic, such as relative positioning to an adjacent, proximate, or same-side-of-device button. The latter example is described primarily herein by of illustration and not limitation. In other contemplated embodiments, the relative positioning can, instead or also, involve a relative positioning of the button with respect to another phone feature, such as closeness to a camera lens of the phone, to a transition (e.g., corner) of the device or to a transition of a user-perspective view area (e.g., upper right transition, lower left transition, etc.).

With further reference to FIG. 5, the relative positioning of the first button 512 can be referred to as a first relative-positioning characteristic, which can include being above (in the context of the illustration) the second button 514, on the first side 504 of the device 500. The relative positioning for the second button 514 can be referred to as a second relative-positioning characteristic, which can include, conversely, being below the first button 512.

Relative-positioning characteristics for the third and fourth buttons 516, 518 are similar, on the second side 506 of the device 500.

The button-state/function assignment for the example device 500 includes at least four assignments, one corresponding to each button 512, 514, 516, 518. A first assignment is linked to a higher button within a first group 11 of areas (UPBAs 1-10), the first group of areas 11 including the first five UPBAs 1-5. For the orientation shown in FIG. 5, then, the first button 512 would be mapped by the software to the first assignment, the first button 512 having the relative positioning corresponding to the first assignment—i.e., being the higher of the two buttons in the first UPBA group 11 of areas.

A second assignment is linked to a lower button within the first UPBA group 11. For the orientation shown in FIG. 5, then, the second button 514 would be mapped by the software to the second assignment, the second button 514 having the relative positioning the corresponding to the second assignment—i.e., being the lower button in the first UPBA group 11 of areas.

It should be appreciated that while two button positions for the first group 11 are shown for the example device 500, the device in implementation can have more than two buttons on either or both sides.

In a hypothetical embodiment that is not shown, a relative position of a middle button of three is included, where the middle button is positioned between a higher button and a lower button, or below the higher button and above the lower button.

Continuing with FIG. 5, a third state/function assignment is linked to a higher button within a second group 12 of areas of the UPBAs 1-10, the second group 12 including the second five UPBAs 6-10. For the orientation shown in FIG. 5, then, the third button 516 would be mapped by the software to the third assignment, the third button 516 having the relative positioning corresponding to the third assignment—i.e., being the higher button in the second group 12 of UPBAs.

Finally, a fourth state/function assignment is linked to a lower button within the second group of areas 12. For the orientation of FIG. 5, then, the fourth button 518 would be mapped by the software to the fourth assignment, the fourth button 518 having the relative positioning corresponding to the third assignment—i.e., being the lower button in the second group 12 of UPBAs.

Re-assignments of states/functions are now described with reference to FIGS. 5 and 6. As provided, the device 500 is rotated, e.g., 180° about the Z axis, between the view of FIGS. 5 and 6. The side buttons 512, 514, 516, 518 thus switch sides.

The general viewing areas 11 (UPBAs 1-5), 12 (UPBAs 6-10) called out remain in place while the device moves. The state/function applicable to each button is re-assigned in response to the change in orientation. The reassignment involves, more particularly, re-mapping the assignments to correspond to the new relative positioning characteristics for the buttons 512, 514, 516, 518.

As defined above, the first assignment is linked to a higher button within the first group 11 of UPBAs 1-5. For the new orientation shown in FIG. 6, then, now the fourth button 518 would be mapped by the software to the first assignment, the fourth button 518 now having the relative positioning corresponding to the first assignment—i.e., being the higher of the two buttons in the first UPBA group 11 of areas 1-5.

Notably, the button 518 mapped to the first assignment after the re-orientation does not in this embodiment end up in the same area (UPBA 1) that the button 512 previously linked to that first assignment. The new first-assignment button 518, instead, ends up in the fourth area UPBA 4. The fourth button 518 is linked to the first assignment nonetheless because, as noted, state/function assignment is linked in the FIGS. 5/6 embodiment to relative positioning, and not strictly to the UPBA.

Continuing with the state/function re-assignments, the second assignment, being linked to a lower button within the first group 11 of UPBAs 1-5, as described above, and so being linked originally to the second button 514 (in connection with the orientation of FIG. 5), is, responsive to the re-orientation, associated by the device software with the third button 516, the third button 516 now having the relative positioning corresponding to the second assignment—i.e., being the lower of the two buttons in the first group 11 of UPBAs 1-5.

The third assignment, being associated to a higher button within the second group 12 of UPBAs 6-10, as described above, and so being linked originally to the third button 516 (FIG. 5), is, with the re-orientation, associated by the device software then with the second button 514, the second button 514 now having the relative positioning corresponding to the third assignment—i.e., being the higher of the two buttons in the second UPBA group 12 of areas 6-10.

The fourth assignment, being linked, as described above, to a lower button within the second group 12 of UPBAs 6-10, and so being linked originally to the third button 516 (FIG. 5), is, with the re-orientation, associated by the device software then with the first button 512, the first button 512 now having the relative positioning corresponding to the fourth assignment—i.e., being the lower of the two buttons in the second UPBA group 12 of UPBAs 5-10.

Benefits of the device physical configuration and arrangement and arrangement and programming allow a user to, following an intended or unintended device rotation, initiate desired functionality by pressing one or more buttons that are positioned in a general area (e.g., in the left or right area 11, 12) and having a certain relative positioning that the user has become accustomed to being associated with the desired function(s). The relative positioning may include, e.g., a button being the higher or lower of two buttons. In the non-illustrated hypothetical mentioned, the relative positioning may include a button being a middle one of three or five buttons in an area (e.g., the first area 11), or may include the button being an upper of two lower buttons of four buttons in the area 11, etc.

A user picking up the device 500 while in the dark, or without looking at the device, or otherwise holding the device so that it ends up in any of the covered orientations, can initiate desired functionality, such as opening or closing a camera program or application (which can be, e.g., the first state/function assignment), or initiating taking of a picture (which can be, e.g., the second state/function assignment), without having to determine exact device orientation.

Figure 7:
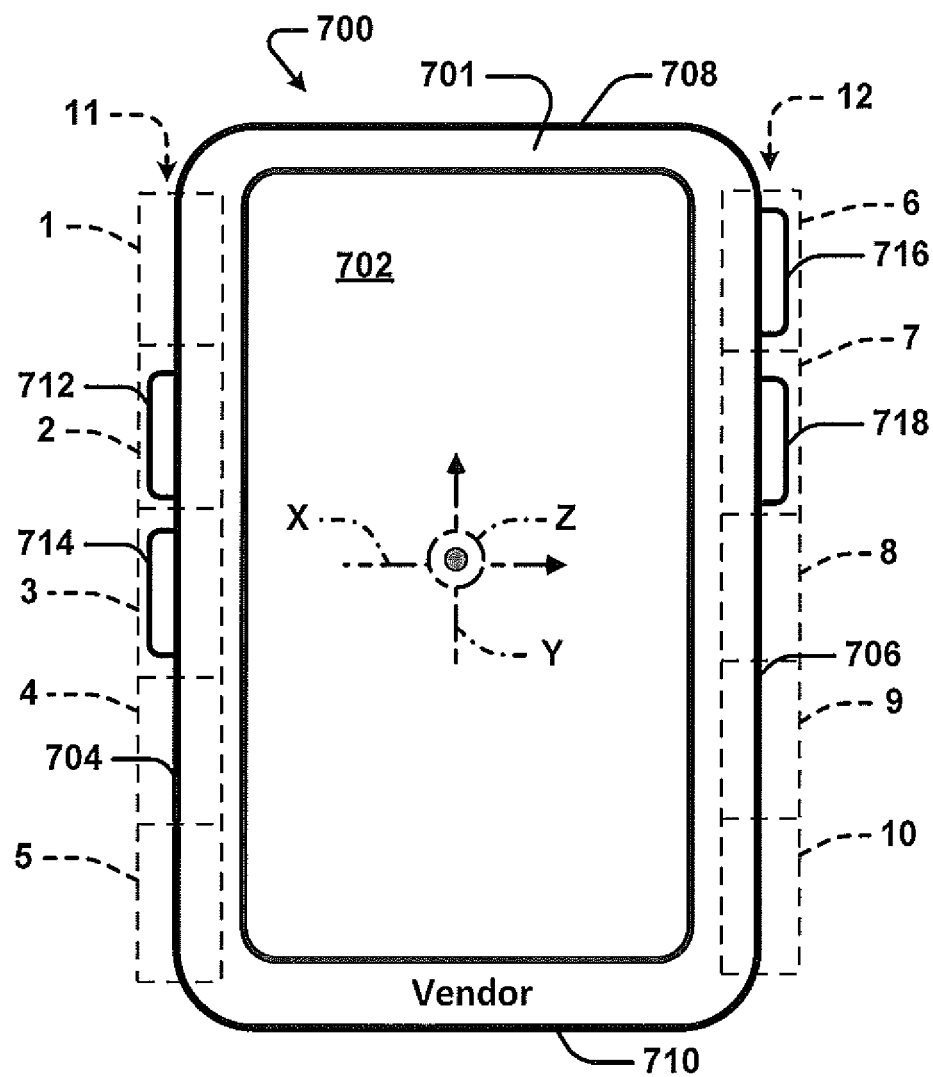
FIG. 7 illustrates a fourth example mobile communication device at a first orientation.
Figure 8:
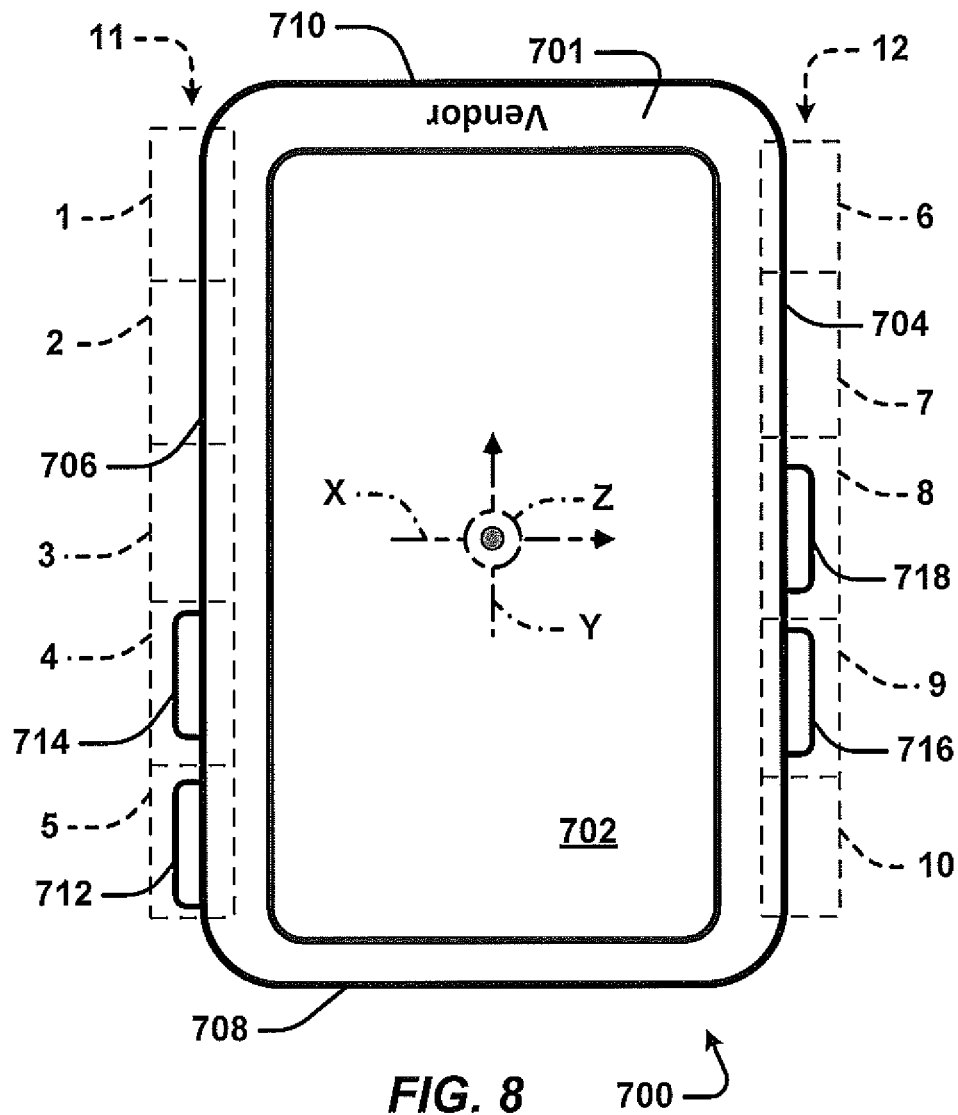
FIG. 8 illustrates the fourth example mobile communication device at a second orientation, being rotated 180° from the first orientation of FIG. 7.
Figure 9:
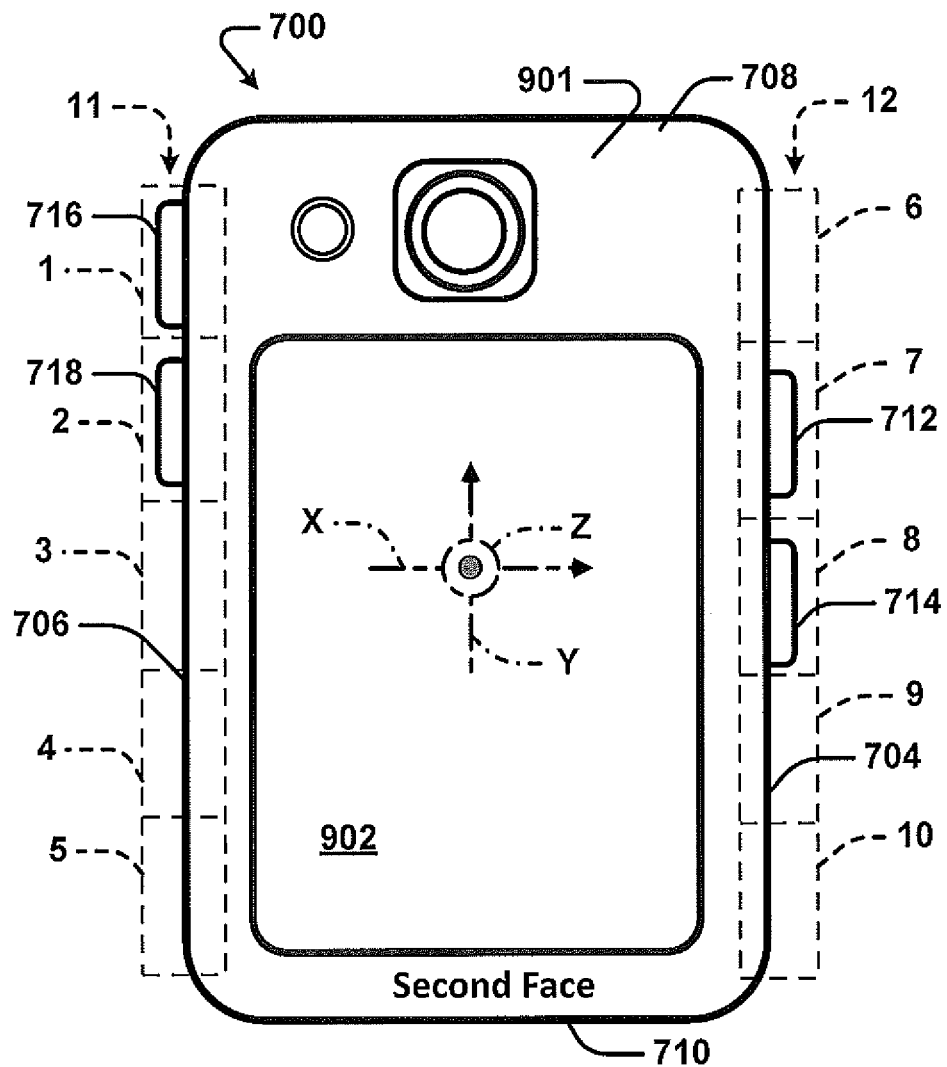
FIG. 9 illustrates the fourth example mobile communication device at a third orientation, being flipped 180° from the first orientation of FIG. 7.

Fourth Example Mobile Communication Device—FIGS. 7-9

FIG. 7 illustrates a fourth example mobile communication device 700 at a first orientation, and FIG. 8 illustrates the device 700 at a second orientation, being rotated 180° from the first orientation.

The fourth example device 700 is presented in FIGS. 7 and 8 primarily to show that the buttons described in connection with the embodiments of FIGS. 5 and 6, in connection with the third example device 500, do not need to be positioned in a certain manner. So while the first and second buttons 512, 514 of the third example device 500 were positioned originally in fourth and fifth UPBAs 4, 5, the first and second buttons 712, 714 of the fourth device 700 are positioned in the second and third slots 2, 3. With the rotation, the buttons 712, 714 end up in the eighth and ninth slots 8, 9.

The buttons 712, 714, 716, 718 of the device 700 of FIG. 7 are linked by the device software with first, second, third, and fourth state/functions, respectively. Similar to the FIGS. 5 to 6 transition, the fourth button 718 of FIG. 7 ends up, after the orientation to that of FIG. 8, being linked to the first assignment for the fourth example device 700, the first assignment being mapped to the upper button in the first group 11. The third button 716 of FIG. 7 ends up, after the orientation to that of FIG. 8, being linked to the second assignment for the device 700, the second assignment being mapped to the lower button in the first group 11.

FIG. 9 illustrates the fourth example communication device 700 at a third orientation, being flipped 180° (about, e.g., the Y axis) from the first orientation of FIG. 7. The device 700 is shown in FIGS. 7 and 9 primarily to show that the device, including the device software, can be configured to re-assign state/function assignments to buttons upon a re-orientation based on relative positioning considerations existing after a flip of the device.

To reiterate, the buttons 712, 714, 716, 718 of the device 700 of FIG. 7 are linked by the device software with first, second, third, and fourth state/functions, respectively. With the flip of the device 700 from the first orientation (FIG. 7) to the third orientation (FIG. 9), the first and second buttons 712, 714 end up in the second group 12 of button areas 6-10 and, more particularly, in the seventh and eighth slots 7, 8. The third and fourth buttons 716, 718 end up with the flip in the first and second slots 1, 2, of the first group 11 of areas (UPBAs 1-5).

In one embodiment, the device software is configured to assign, with (e.g., responsive to) the device flip to the orientation of FIG. 9, to the third button 716, the first assignment, the first assignment being mapped still to the button ending up as the upper button of the first group 11, which is the third button 716 after the flip, as shown in FIG. 9.

The device software in this case would then also assign, with (e.g., responsive to) the device flip to the orientation of FIG. 9, to the fourth button 718, the second assignment, the second assignment being mapped still to the button ending up as the lower button of the first group 11, which is the fourth button 718 after the flip, as shown in FIG. 9.

And the software would then also assign, with (e.g., responsive to) the flip to the orientation of FIG. 9, to the first button 712, the third assignment, the third assignment being mapped still to the button ending up as the upper button of the second group 12, which is the first button 714 after the flip, as shown in FIG. 9.

And finally, the software would, with (e.g., responsive to) the flip, assign to the second button 714, the fourth assignment, the fourth assignment being mapped to the button ending up as the lower button of the second group 12, which is the second button 714 after the flip, as shown in FIG. 9.

The same benefits mentioned above, including facilitating easy operation of the device using button positioning familiar to the user, apply to the fourth example device 700. The familiarity in the embodiments of FIGS. 7-9 include familiar spatial relations (relative positioning) for the buttons.

Fifth Example Mobile Communication Device—FIGS. 10-16

Figure 10:
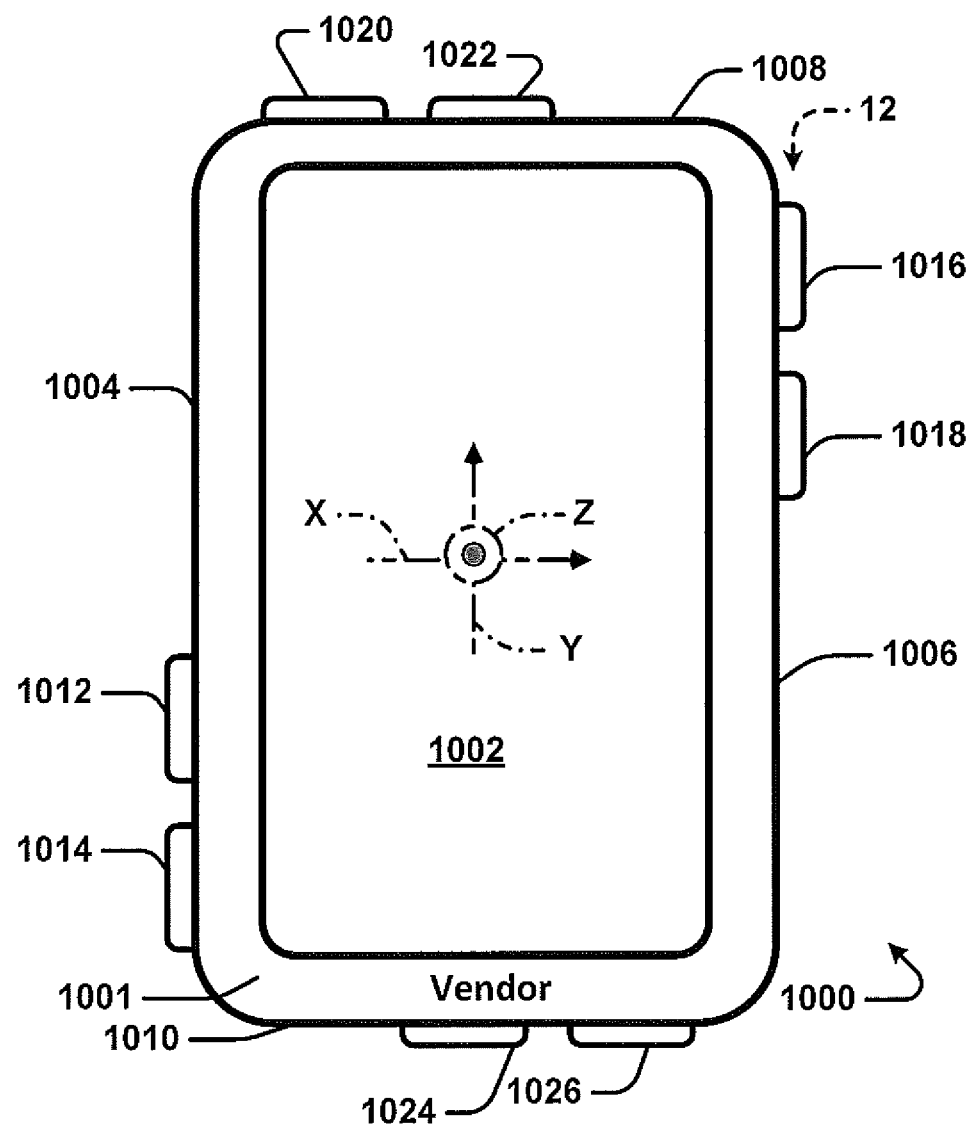
FIG. 10 illustrates a fifth example mobile communication device at a first orientation.
Figure 11:
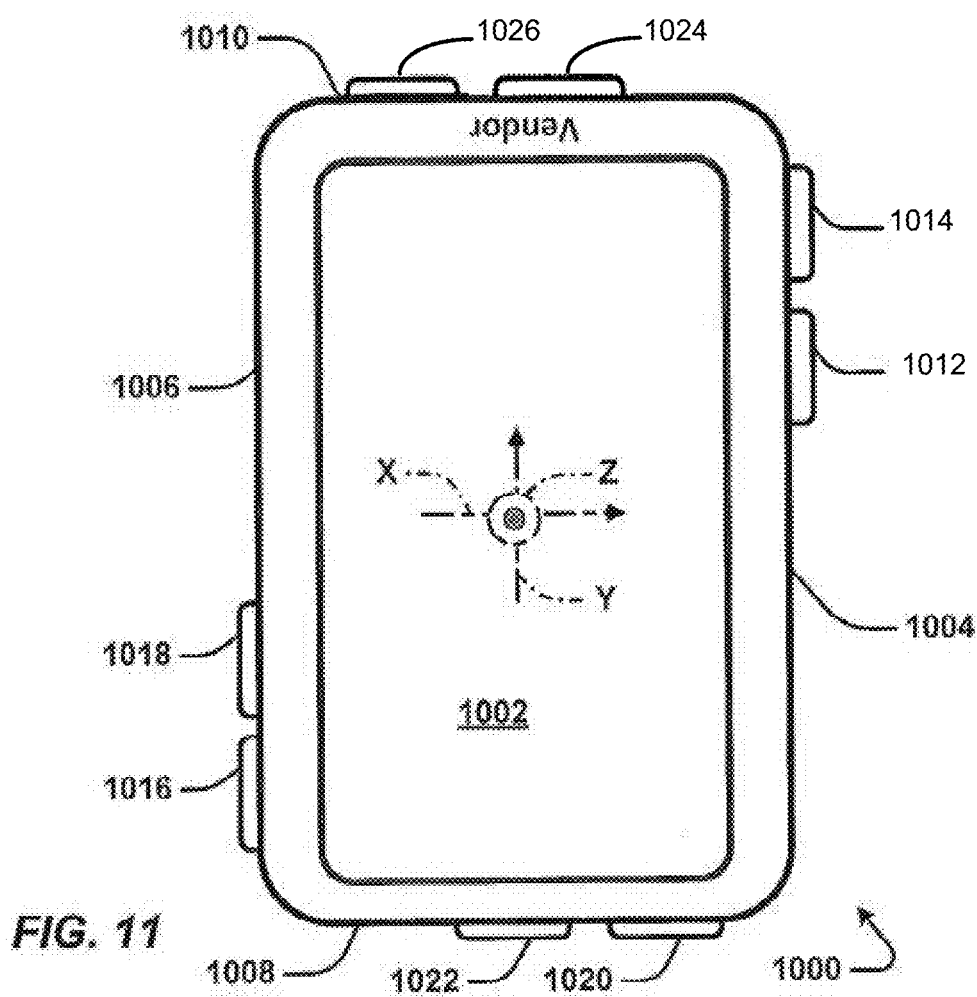
FIG. 11 illustrates the fifth example mobile communication device at a second orientation, being rotated 180° from the first orientation of FIG. 10.

FIG. 10 illustrates a fifth example mobile communication device 1000 at a first orientation, and FIG. 11 illustrates the device 1000 at a second orientation, being rotated 180° from the first orientation.

The fifth example device 1000 is presented in FIGS. 10 and 11 primarily to show that the buttons described in connection with the embodiments of FIGS. 5-7, in connection with the third and fourth example devices 500, 700, can instead or also include buttons positioned at the top 1008 and the bottom 1010 of the device 1000.

With further reference to FIG. 10, the device 1000 includes a first face 1001 including within it display screen 1002, a first side 1004, a second side 1006, a top side 1008, and a bottom side 1010. The device 1000 also includes first through fourth side buttons 1012, 1014, 1016, 1018, fifth and sixth top buttons 1020, 1022, and seventh and eighth bottom buttons 1024, 1026.

As with the four side buttons 512, 514, 516, 518 of the device 500 of FIGS. 5 and 6, and with the four side buttons 712, 714, 716, 718 of the device 700 of FIGS. 7 and 8, the state/function assignments for the first two side buttons 1012, 1014 of the device 1000 are switched with the state/function assignments for the second two side buttons 1016, 1018 when the device 1000 is rotated 180°. These states/functions can be referred to as first through fourth state/function assignments.

As can be seen, the first top button 1020 is a left-most top button of the two top buttons 1020, 1022, while the second top button 1022 is right-most. And the first bottom button 1024 is a left-most bottom button of the two bottom buttons 1024, 1026, while the second bottom button 1026 is right-most.

The state/function assignments assigned to the two top buttons 1020, 1022 for the orientation in FIG. 10 can be referred to as fifth and sixth assignments corresponding to the left-most top (fifth overall) button 1020 of the two upper buttons 1020, 1022 and the right-most top (sixth overall) button 1022, respectively.

The state/function assignments assigned to the two bottom buttons 1024, 1026 for the orientation in FIG. 10 can be referred to as seventh and eighth assignments corresponding to the left-most bottom (seventh overall) button 1024 of the two bottom buttons 1024, 1026 and the right-most bottom (eighth) button 1026.

The device software is configured to, with the 180° re-orientation between FIGS. 10 and 11, change mapping of the fifth assignment from the fifth button 1020 to the eighth button 1026, which ends up, with the re-orientation, being the left-most top button.

The device software is configured to, with the 180° re-orientation between FIGS. 10 and 11, change mapping of the sixth assignment from the sixth button 1022 to the seventh button 1024, which ends up, with the re-orientation, being the right-most top button.

The device software is configured to, with the 180° re-orientation between FIGS. 10 and 11, change mapping of the seventh assignment from the seventh button 1024 to the sixth button 1022, which ends up, with the re-orientation, being the right-most top button.

The device software is also configured to, with the 180° re-orientation between FIGS. 10 and 11, change mapping of the eighth assignment from the eighth button 1026 to the fifth button 1020, which ends up, with the re-orientation, being the left-most top button.

Figure 12:
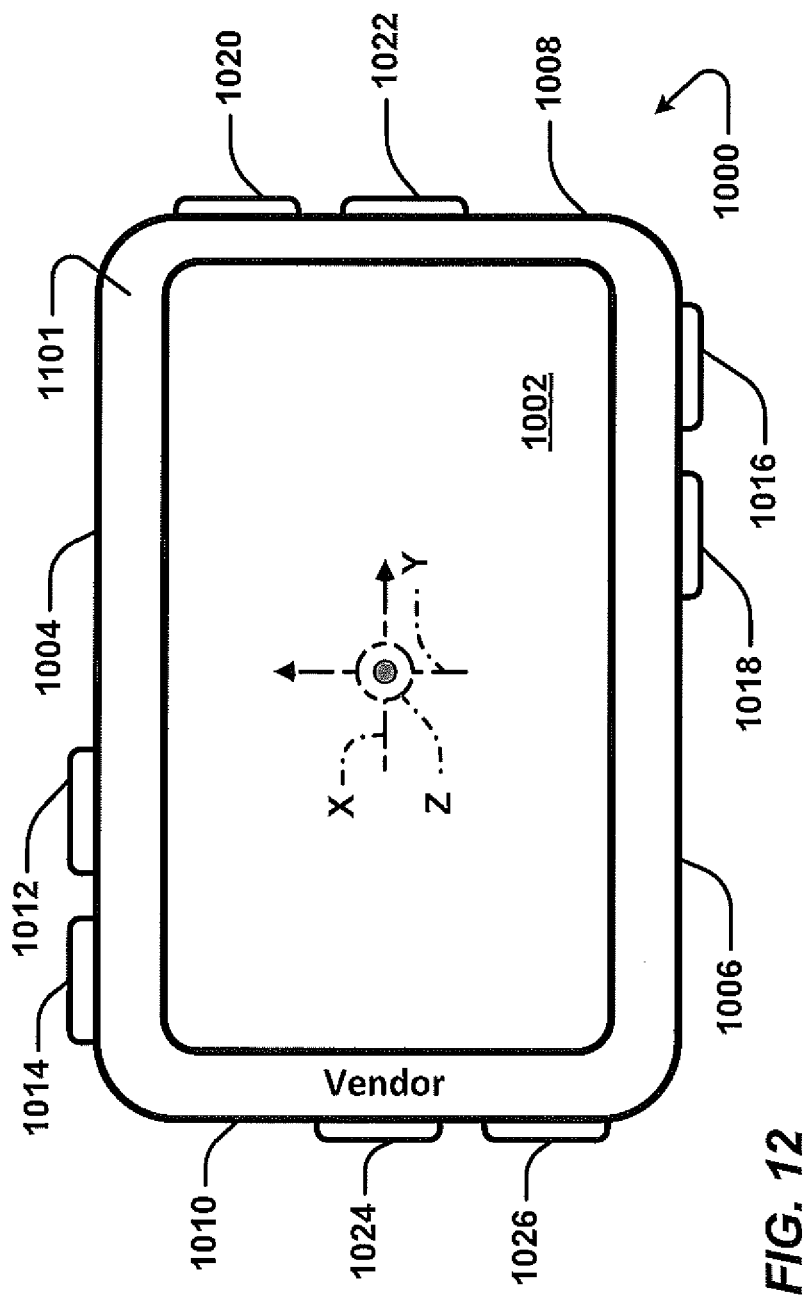
FIG. 12 illustrates the fifth example mobile communication device at a third orientation, being rotated 90° from the first orientation of FIG. 10.

FIG. 12 illustrates the device 1000 at a third orientation, being rotated 90° clockwise (CW) from the first orientation.

FIG. 12 vis-à-vis FIG. 10 is included primarily to show that the relative positioning concept described above for various embodiments—e.g., the software programming that changes state/function assignments in response to a device re-orientation, and based on resulting relative positioning of the buttons, such as based on whether each buttons ends up as the upper or lower button on a side or a right-most or left-most button on the top or bottom—can be applied to change state/function assignments from long-side buttons to short-side (e.g., top or bottom) buttons upon a 90° rotation.

The device software is configured to, with the 90° re-orientation between FIGS. 10 and 12, change mapping of the first assignment from the first button 1012 to the seventh button 1024, which ends up, with the re-orientation, being the upper of two buttons on the left side of the device from the user's perspective.

And the device software is configured to, with the 90° re-orientation between FIGS. 10 and 12, change mapping of the second assignment from the second button 1014 to the eighth button 1026, which ends up, with the re-orientation, being the lower of two buttons on the left side of the device from the user's perspective.

The device software is configured to, with the 90° re-orientation between FIGS. 10 and 12, change mapping of the third assignment from the third button 1016 to the fifth button 1020, which ends up, with the re-orientation, being the upper of two buttons on the right side of the device from the user's perspective.

The device software is configured to, with the 90° re-orientation between FIGS. 10 and 12, change mapping of the fourth assignment from the fourth button 1018 to the sixth button 1022, which ends up, with the re-orientation, being the lower of two buttons on the right side of the device from the user's perspective.

Assignments corresponding to upper and lower user-view areas can be changed too based on the 90° rotation from FIG. 10 to FIG. 12. For instance, the device software is configured to, with the 90° re-orientation between FIGS. 10 and 12, change mapping of the fifth assignment from the fifth button 1020 to the second button 1014, which ends up, with the re-orientation, being the left-most top button.

As further example, the device software is configured to, with the 90° re-orientation between FIGS. 10 and 12, change mapping of the sixth assignment from the sixth button 1022 to the first button 1012, which ends up, with the re-orientation, being the right-most top button.

The device software is configured to, with the 90° re-orientation between FIGS. 10 and 12, change mapping of the seventh assignment from the seventh button 1024 to the fourth button 1018, which ends up, with the re-orientation, being the left-most bottom button.

The device software is configured to, with the 90° re-orientation between FIGS. 10 and 12, change mapping of the eighth assignment from the eighth button 1026 to the third button 1016, which ends up, with the re-orientation, being the right-most bottom button.

With the physical configuration and programming of the device 1000, as described in connection with the device rotation between FIG. 10 and FIG. 12, reassignments of state/functions to device buttons allow a user to, following an intended or unintended 90° device rotation, initiate desired functionality by pressing one or more buttons that are positioned in a general area (e.g., in the top or bottom area) and having a certain relative positioning that the user has become accustomed to being associated with the desired function(s). The relative positioning may include, e.g., a button being a right-most or left-most of two buttons. In a referenced, non-illustrated hypothetical, the relative positioning can include the button being the middle of three buttons in the area (e.g., top or bottom of the device).

As with the other embodiments, a user picking up the device 1000 while in the dark, or without looking at the device, or otherwise holding the device so that it ends up in any of the covered orientations, including the 90° orientation, can initiate desired functionality, such as opening or closing a camera program or application, or initiating taking of a picture, without having to determine exact device orientation.

Figure 13:
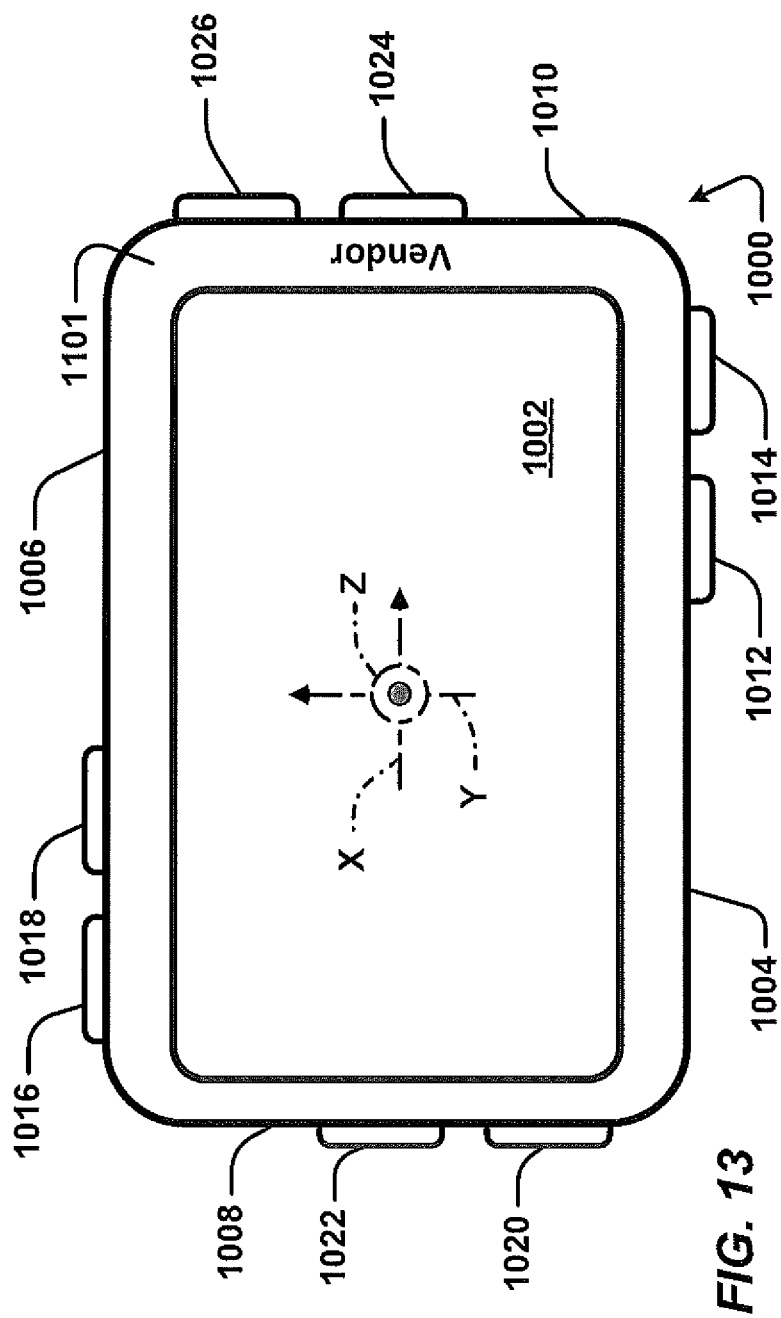
FIG. 13 illustrates the fifth example mobile communication device at a fourth orientation, being rotated 270° from the first orientation of FIG. 10.

FIG. 13 shows the device 1000 at a fourth orientation, being rotated 270° from the first orientation of FIG. 10, or 180° from the third orientation of FIG. 12. Device software reassignment of state/functions as the device is rotated from the first orientation to the fourth orientation are generally like those described above in connection with reassignment of state/functions as the device is rotated from the first orientation to the third orientation.

While state/function reassignments are described herein primarily in connection with a device turn commencing with the device being in the first position (e.g., the first position of FIGS. 1, 3, 5, 7, and 10), the devices are configured to execute reassignments as needed between any two device orientations. As further example of the reassigning operations, then, using the present embodiment, reassignments are made in response to the device 1000 being rotated 180° from the third orientation of FIG. 12 to the fourth orientation of FIG. 13. The state/function assigned for the orientation of FIG. 12 to the second button 1014, being the left-most button in the upper area (the top long side) in FIG. 12, is re-mapped, with the move to the fourth orientation, to the third button 1016, which becomes the left-most button in that upper area.

Similarly, the state/function assigned for the orientation of FIG. 12 to the first button 1012, being the right-most button in the upper area (the top long side) in FIG. 12, is re-mapped, with the move to the fourth orientation, to the fourth button 1018, which becomes the right-most button in the upper area.

Further in this example, the state/function assigned for the orientation of FIG. 12 to the fourth button 1018, being the left-most button in the lower area (the bottom long side) in FIG. 12, is re-mapped, with the move to the fourth orientation, to the first button 1012, which becomes the left-most button in that lower area. And the state/function assigned to the third button 1016 is re-mapped, with the move to the fourth orientation, to the second button 1014, which becomes the right-most button in that lower area.

Figure 14:
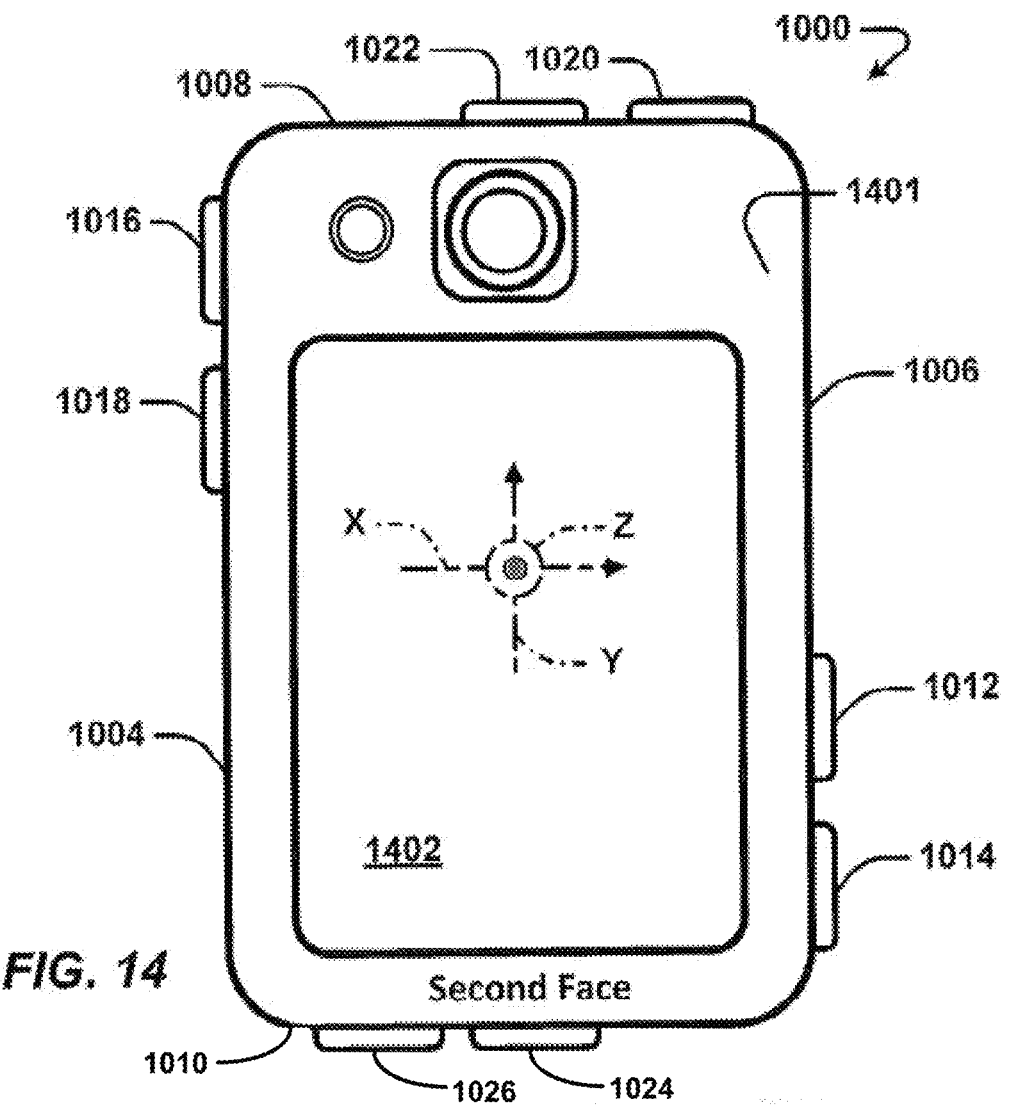
FIG. 14 illustrates the fifth example mobile communication device at a fifth orientation, being flipped 180° from the first orientation of FIG. 10.
Figure 15:
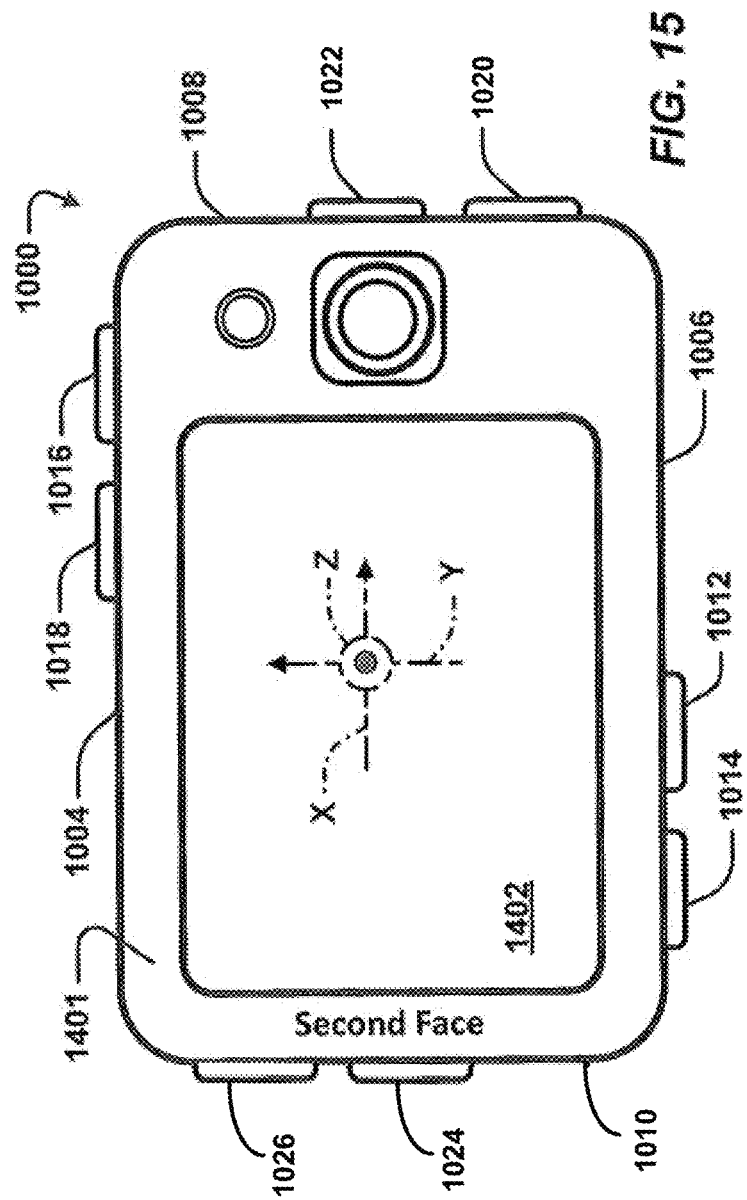
FIG. 15 illustrates the fifth example mobile communication device at a sixth orientation, being rotated 90° from the fifth orientation of FIG. 14.
Figure 16:
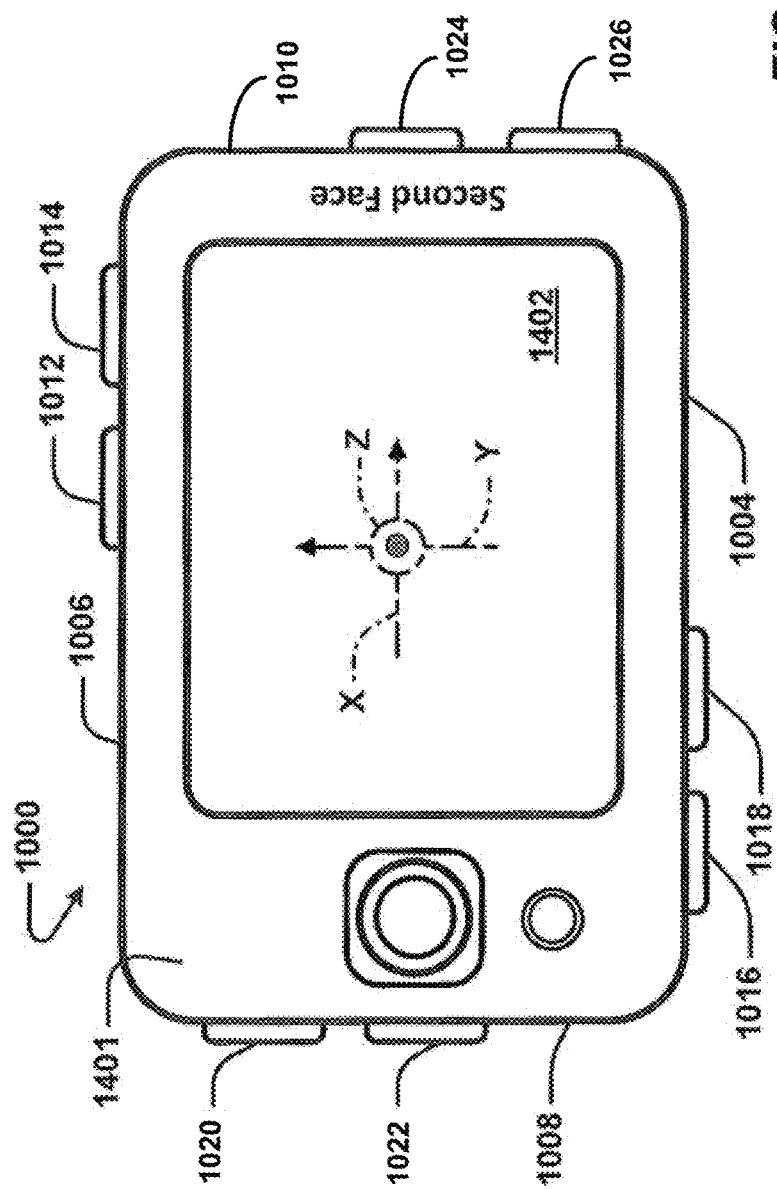
FIG. 16 illustrates the fifth example mobile communication device at an eighth orientation, being rotated 270° from the orientation of FIG. 14.

FIGS. 14-16 illustrate the device 1000 at a fifth, sixth, and seventh orientations. The device for the fourth orientation (FIG. 14) is flipped 180° from the first orientation of FIG. 10. The device for the fifth orientation (FIG. 15) is rotated 90° from the fifth orientation of FIG. 14. And the device for the sixth orientation (FIG. 15) is rotated 270° from the fourth orientation of FIG. 14.

The device software reassigns state-functions when the device is moved to these orientations (fifth through seventh) according to the relative-positioning protocol described above. In the interest of brevity, each reassignment associated with device rotation to these orientations will not be described separately here.

As just one illustrative reassignment regarding FIG. 14, the state/function assigned for the orientation of FIG. 10 to the sixth button 1022, being the right-most button in the upper area (the top short side) in FIG. 10, is re-mapped, with the move to the fifth orientation (FIG. 14), to the fifth button 1020, which becomes the right-most button in that upper area.

As an illustrative reassignment regarding FIG. 15, the state/function assigned for the orientation of FIG. 10 to the fourth button 1018, being the lower button in the right device area of FIG. 10, is re-mapped, with the move to the sixth orientation (FIG. 15), to the fifth button 1020, which becomes the lower button in the right area.

And as an illustrative reassignment regarding FIG. 16, the state/function assigned for the orientation of FIG. 10 to the first button 1012, being the upper button in the left device area of FIG. 10, is re-mapped, with the move to the seventh orientation (FIG. 16), to the fifth button 1020, which becomes the upper button in the left area.

Sixth Example Mobile Communication Device—FIGS. 17-20

Figure 17:
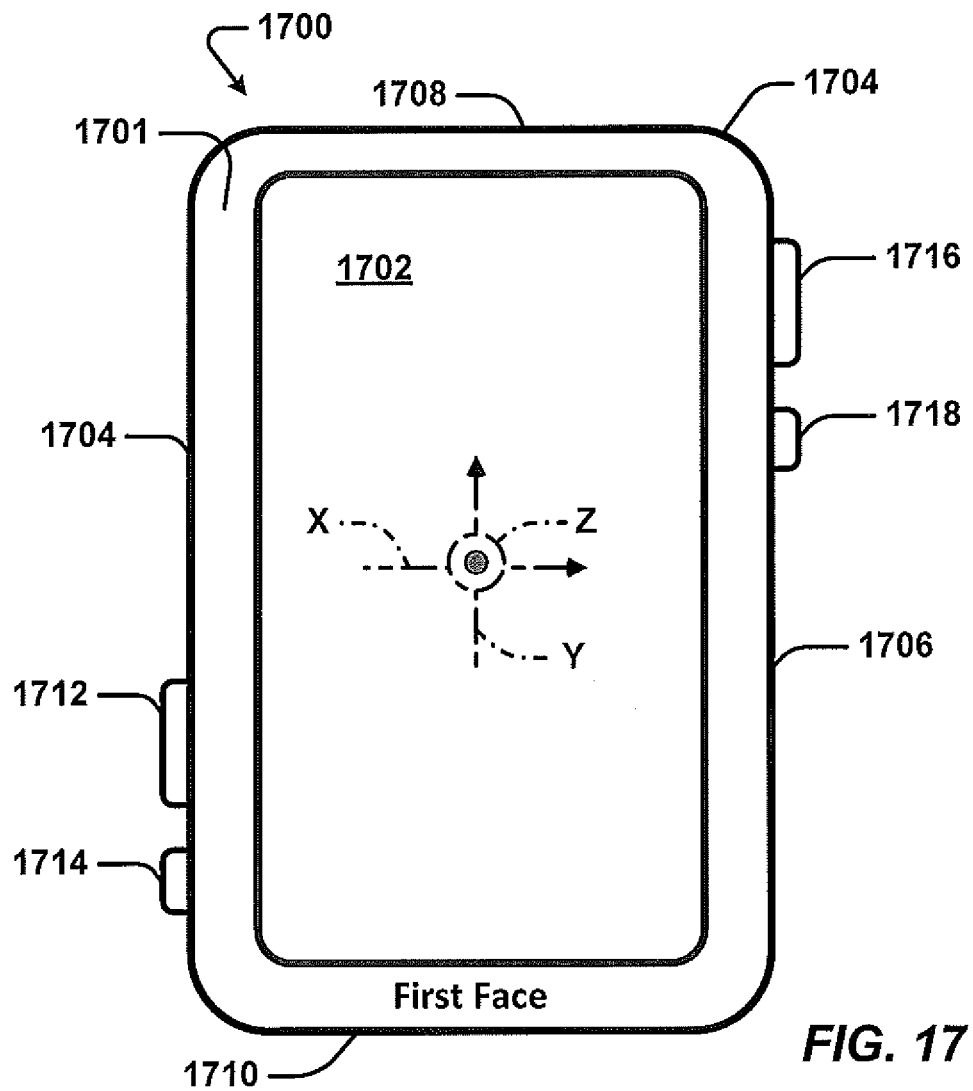
FIG. 17 illustrates a sixth example mobile communication device at a first orientation.

FIG. 17 illustrates a sixth example mobile communication device at a first orientation. The device 1700 includes more than one button on at least two opposing sides. At least two buttons on each applicable side differ from each other in terms of size and/or shape.

Shape and size differences shown and described are provided only by way of illustration and do not limit the scope of possible shape and/or size differences that can be used according to the present teachings.

The buttons illustrated include a first button 1712 being larger/longer, and more rectangular, generally, than a second button 1714, being smaller/shorter and more-square, on a first side 1704 of the device 1700. The buttons also include a third button 1716 being larger/longer, and more rectangular than a fourth button 1718, being smaller/shorter and more-square, on an opposite, second side 1706. The device 1700 further includes a first face 1701 including within it display screen 1702, a top side 1708, and a bottom side 1710.

The device 1700 is configured to re-map state/function assignments to the buttons based on the size and/or shape of the buttons. Button sizes can be defined in various ways. For instance, in one embodiment, the button size relates generally to button length—i.e., length in a direction along a side of the mobile communication device on which the button sits.

In this embodiment, a first button would be considered to have a greater size if it is notably longer than a second button, even though the second button may be wider, or deeper, and so have a similar surface area on one or more surfaces, or define a similar volume. In one embodiment, on the other hand, surface area of one or more surfaces is indicative, or represents, of the size characteristic described. And in one embodiment, a volume of space taken up by the button is indicative, or represents, the size characteristic. In one contemplated embodiment, button size includes a depth, or distance measured between an outer surface of the button (farthest from a side of the body on which the button sits) and the side of the body.

Figure 18:
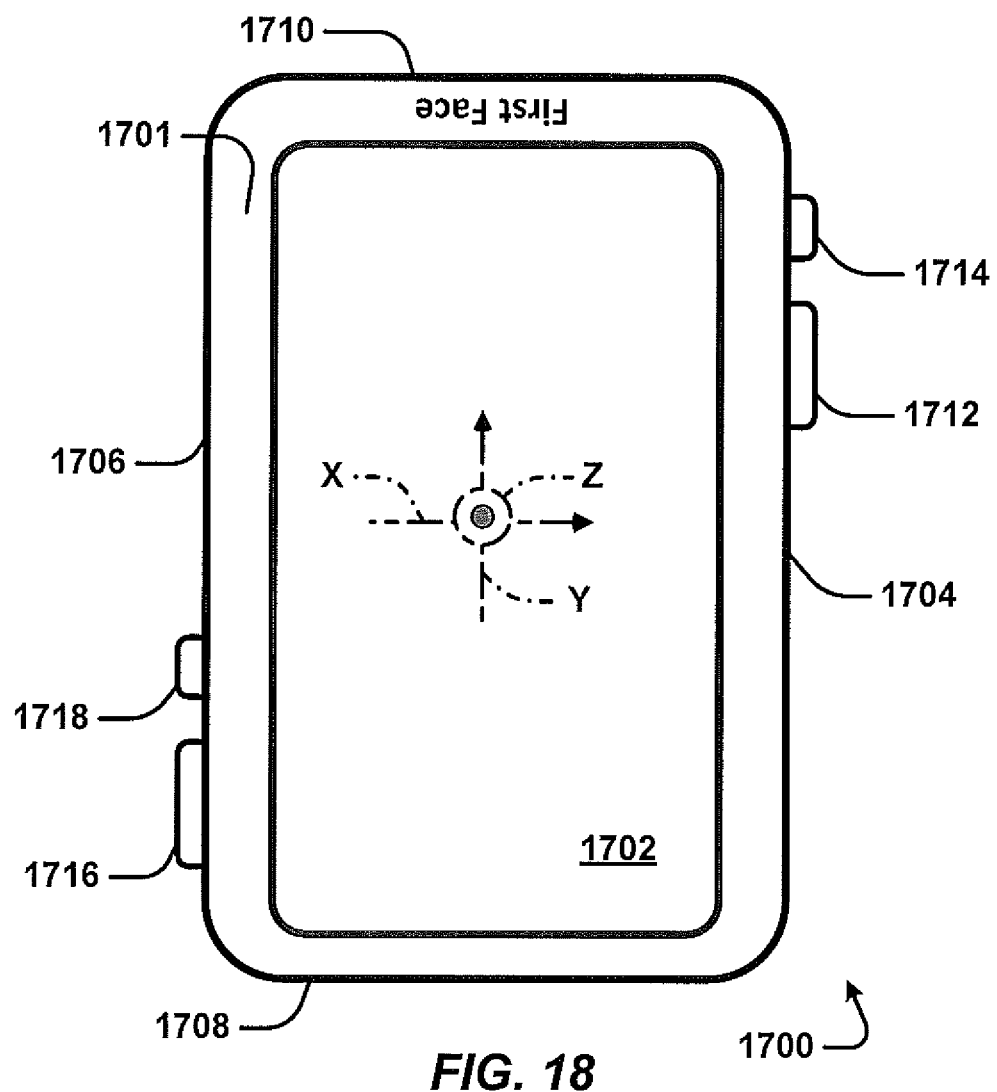
FIG. 18 illustrates the sixth example mobile communication device at a second orientation, being rotated 180° from the first orientation of FIG. 17.

The device software is configured to change mapping for a first state/function assignment from the first button 1712, being a larger/longer and more rectangular of the two buttons on the left side of the device, to the third button 1716 in response to the device being turned from the first orientation (FIG. 17) to the second orientation (FIG. 18), the third button becoming the larger/longer and more rectangular on the left side of the device (FIG. 18).

Notably, the third, replacing button 1716, ends up linked to the first state/function assignment though having (FIG. 18) a different relative position than the first, original button 1712 had (FIG. 17). Namely, while the first button 1712 was a top of two buttons on the first side 1702 of the device in the first orientation (FIG. 17), the replacing, third button 1716 ends up being a lower of two buttons on the first side 1702 (FIG. 18). In this case, then, the sizing and/or shaping of buttons on the respective device sides control the re-assigning operations.

In a contemplated embodiment, a replacing button (e.g., button becoming linked to a state/function assignment linked previously, before a turn of the device, to another button) may be related to an original button (e.g., button to which the assignment was previously linked) in more than one way at a time to warrant the re-linking. The device is configured in one embodiment (not that of FIGS. 17 and 18), for example, so that a larger/more-rectangular button on a side of the device is replaced by device rotation by an opposite-side larger/more-rectangular button, wherein each of the buttons is also the higher of two buttons on their respective sides. The software can be configured for such cases to link the function from the prior to the latter buttons based on the size, shape, and/or relative positioning relationships between the buttons.

The device software reassigns state-functions when the device is moved to any orientation including the first through fourth orientations (FIGS. 17-20) according to at least the relative sizing and/or relative shaping protocol mentioned. In the interest of brevity, every reassignment associated with device rotation to these orientations will not be described separately here.

Figure 19:
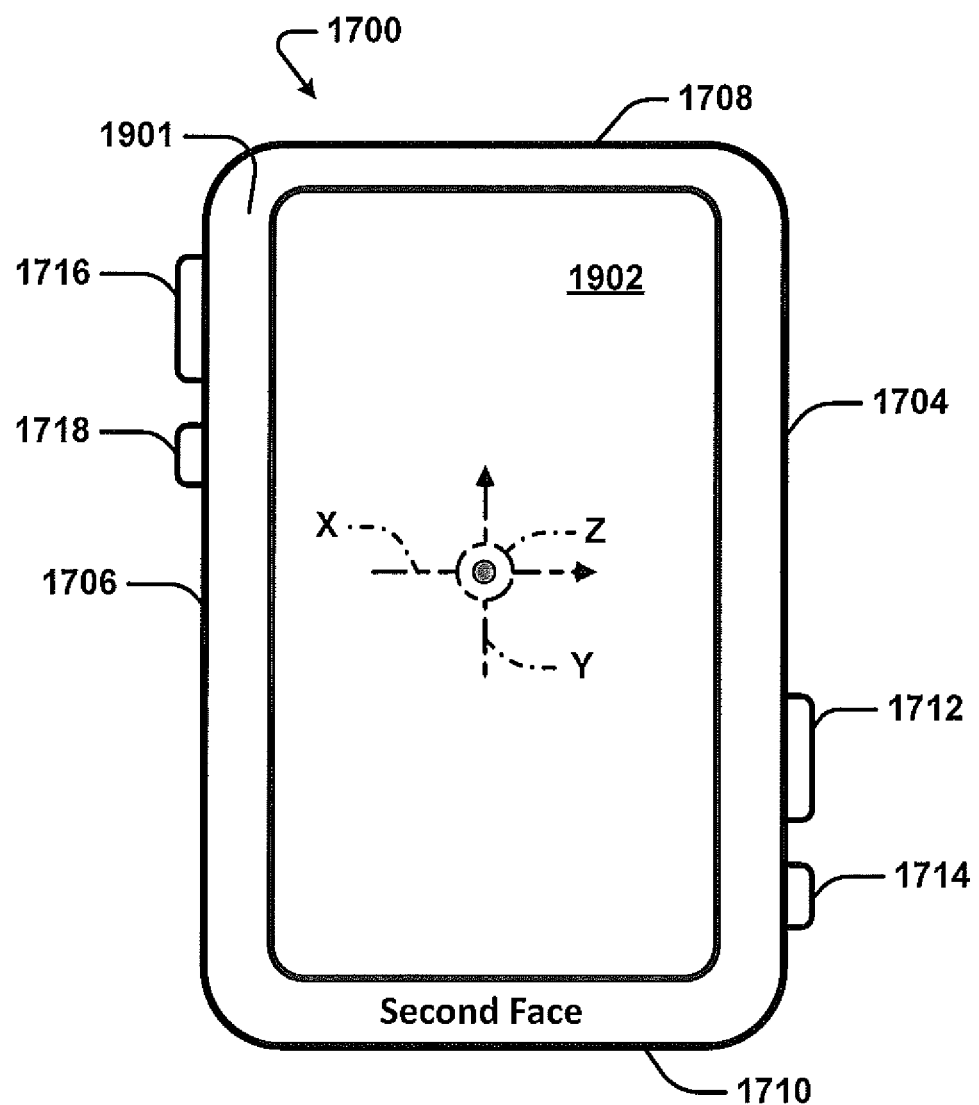
FIG. 19 illustrates the sixth example mobile communication device at a third orientation, being flipped 180° from the first orientation of FIG. 17.

An illustrative reassignment regarding the device move from the first orientation (FIG. 17) to the second orientation (FIG. 18) is provided above. As another illustrative assignment operation, regarding FIG. 19, the state/function assigned for the orientation of FIG. 17 to the second button 1714, being the smaller/shorter, and more-square, button at the left of the device 1700 in FIG. 17, is re-mapped, with the flip to the third orientation (FIG. 19), to the fourth button 1718, which becomes the smaller/shorter, and more-square, button at the left of the device 1700 (FIG. 19).

Figure 20:
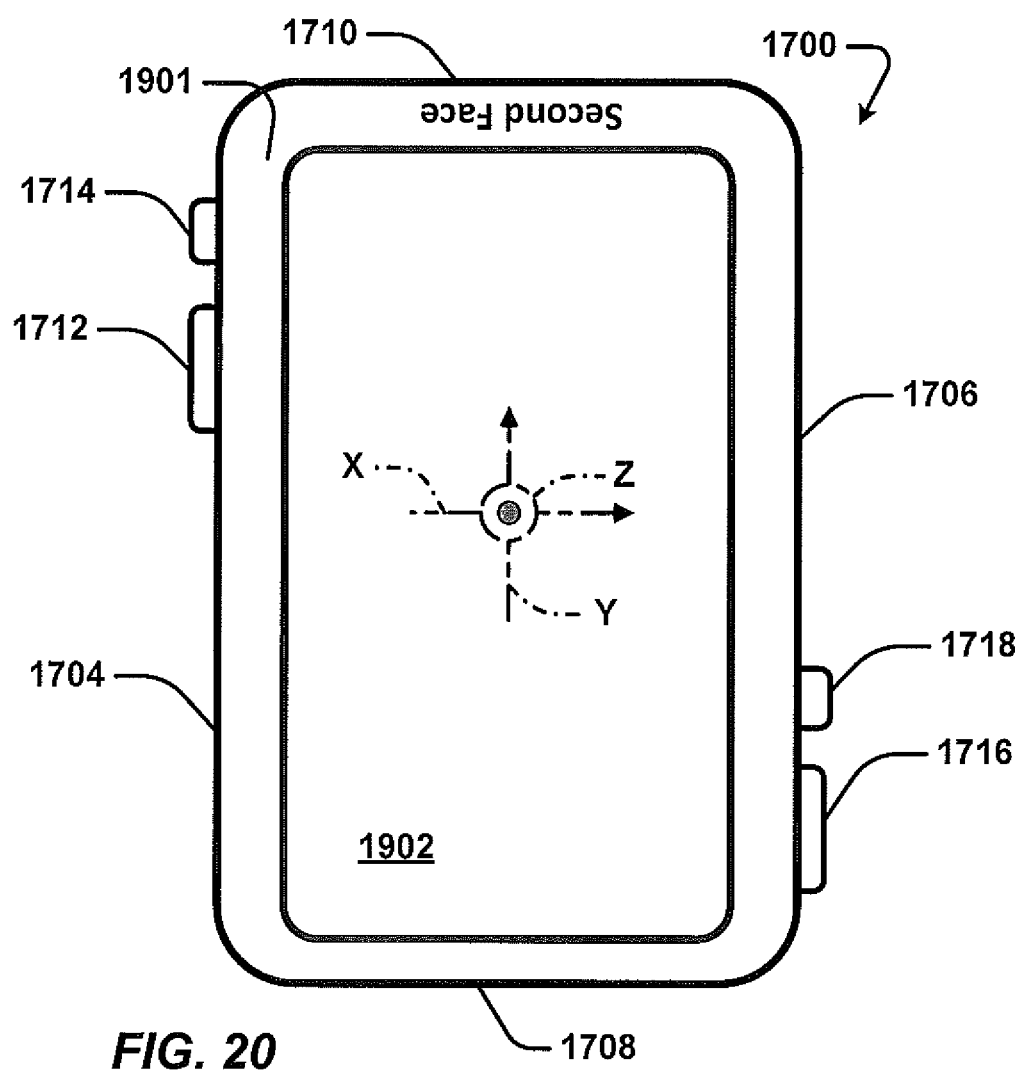
FIG. 20 illustrates the sixth example mobile communication device at a third orientation, being rotated 180° from the third orientation of FIG. 19.

As another illustrative assignment operation, regarding FIG. 20, the state/function assigned for the orientation of FIG. 17 to the third button 1716, being the larger/longer, more-rectangular, button, at the right of the device 1700 in FIG. 17, remains with, or re-mapped away from and back to, the third button as, after a 180 flip (about, e.g., Y axis) and a 180 rotation, the third button 1716 becomes again the larger/longer, more-rectangular, button at the right of the device 1700 (FIG. 20).

Benefits described above regarding other embodiments are applicable as well to implementation of the embodiments associated with the sixth example device.

Seventh Example Mobile Communication Device—FIGS. 21-27

The seventh example device 2100 is presented in FIGS. 21-27 primarily to show that the reassignment operations described in connection with the sixth device 1700, and embodiments of FIGS. 17-20, can include (i) reassigning state/functions to/from top and button buttons, or short-side buttons (regarding, e.g., generally rectangular devices) and (ii) reassigning state/functions in response to the device being flipped (e.g., 180° rotation about the Y axis) or rotated 90°.

The device software reassigns state-functions when the device is moved to any orientation including the first through seventh orientations (FIGS. 21-27) according to at least the relative sizing and/or relative shaping protocol described above in connection with the embodiments of FIGS. 17-20. In the interest of brevity, each reassignment associated with device rotation to these orientations will not be described separately here.

Figure 21:
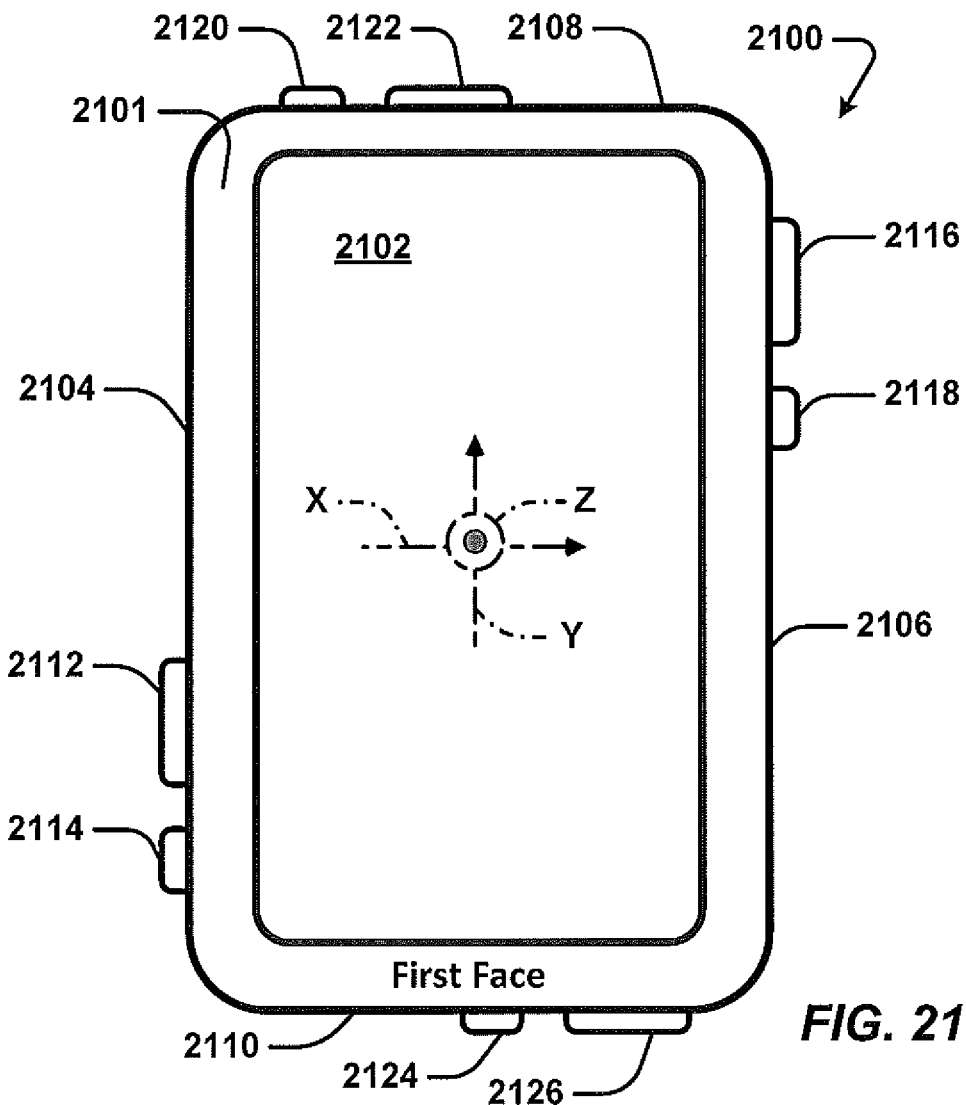
FIG. 21 illustrates a seventh example mobile communication device at a first orientation.
Figure 22:
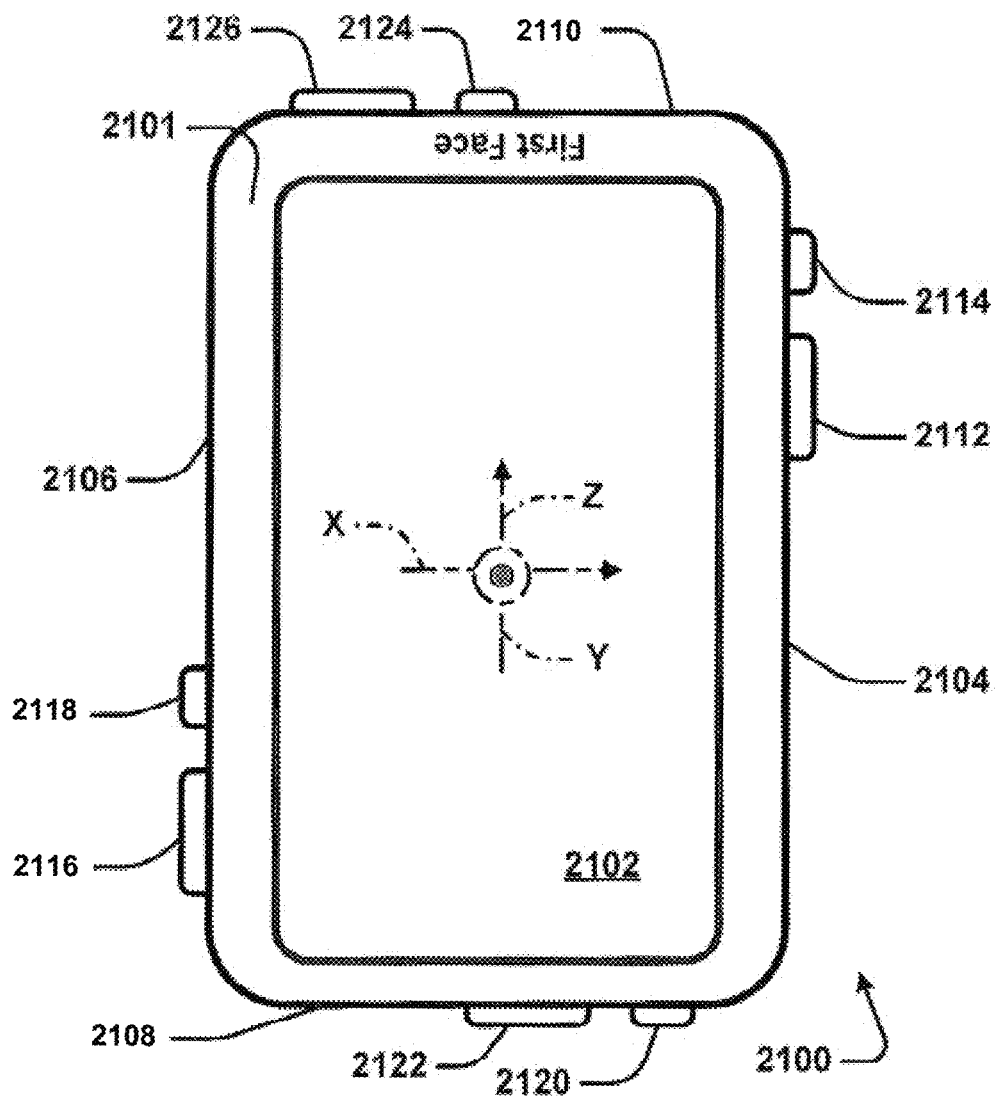
FIG. 22 illustrates the seventh example mobile communication device at a second orientation, being rotated 180° from the first orientation of FIG. 21.

As an illustrative reassignment regarding the device move from the first orientation (FIG. 21) to the second orientation (FIG. 22), the state/function assigned for the orientation of FIG. 21 to the sixth button 2122, being the larger/longer, and more-rectangular, button at the top of the device 2100 in FIG. 21, is re-mapped, with the flip to the second orientation (FIG. 22), to the eighth button 2126, which becomes the larger/longer, and more-rectangular, button at the top of the device 2100 (FIG. 22).

Figure 23:
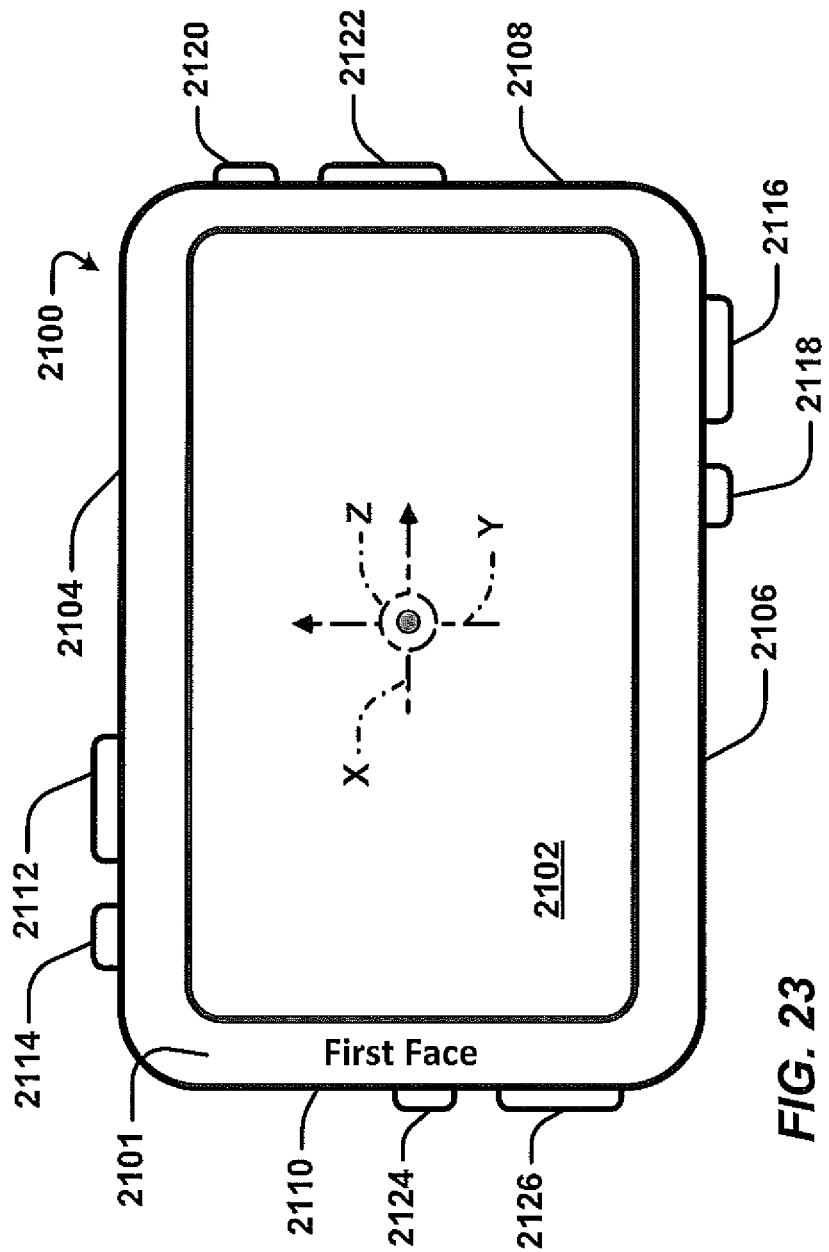
FIG. 23 illustrates the seventh example mobile communication device at a third orientation, being rotated 90° from the first orientation of FIG. 21.
Figure 24:
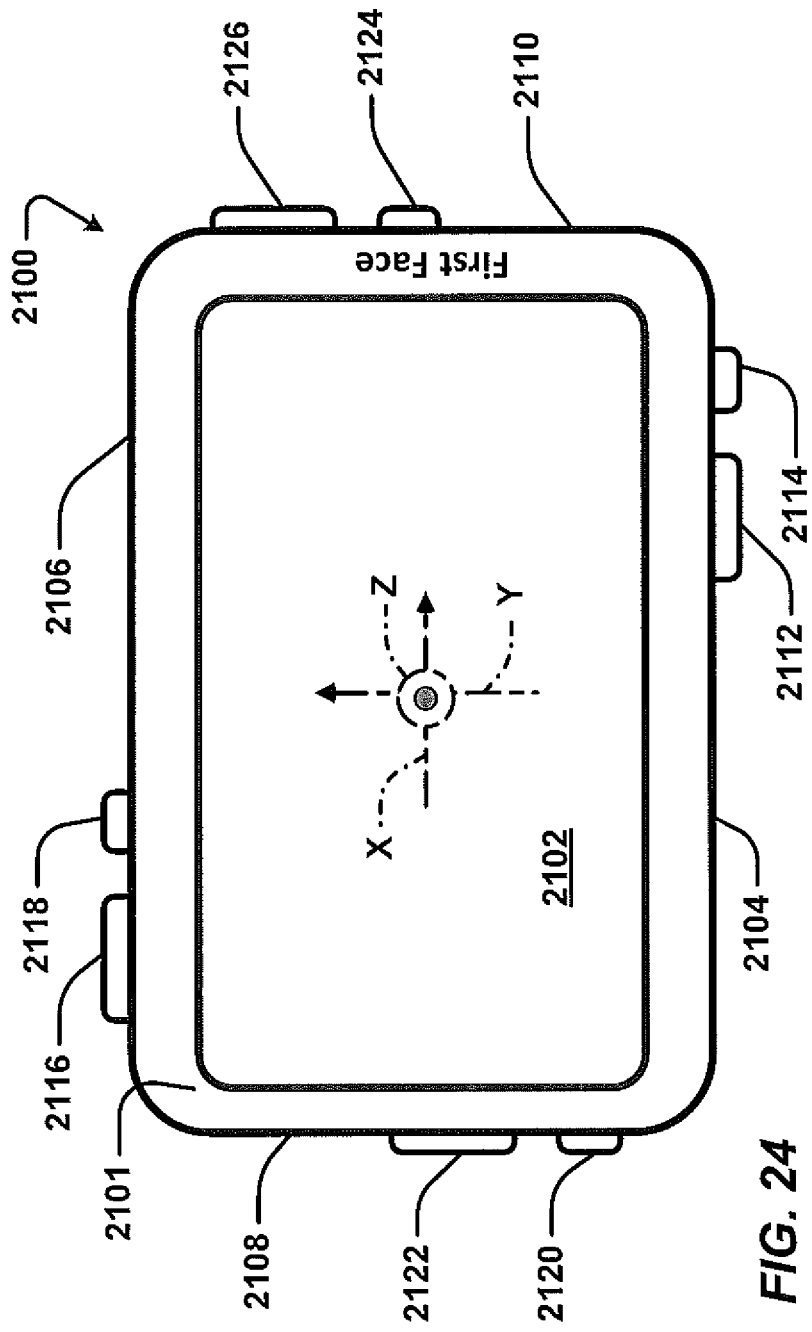
FIG. 24 illustrates the seventh example mobile communication device at a fourth orientation, being rotated 270° from the first orientation of FIG. 21.
Figure 25:
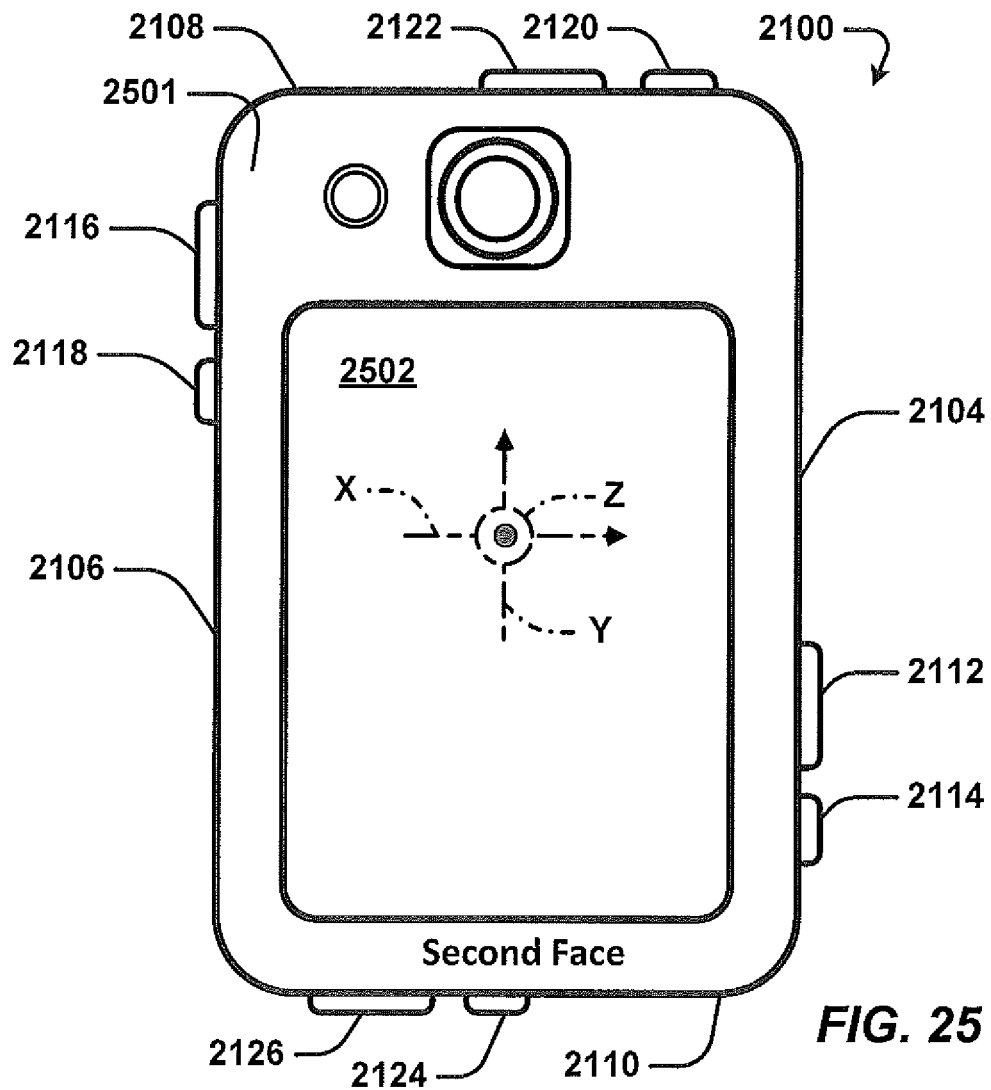
FIG. 25 illustrates the seventh example mobile communication device at a fifth orientation, being flipped 180° from the first orientation of FIG. 21.
Figure 26:
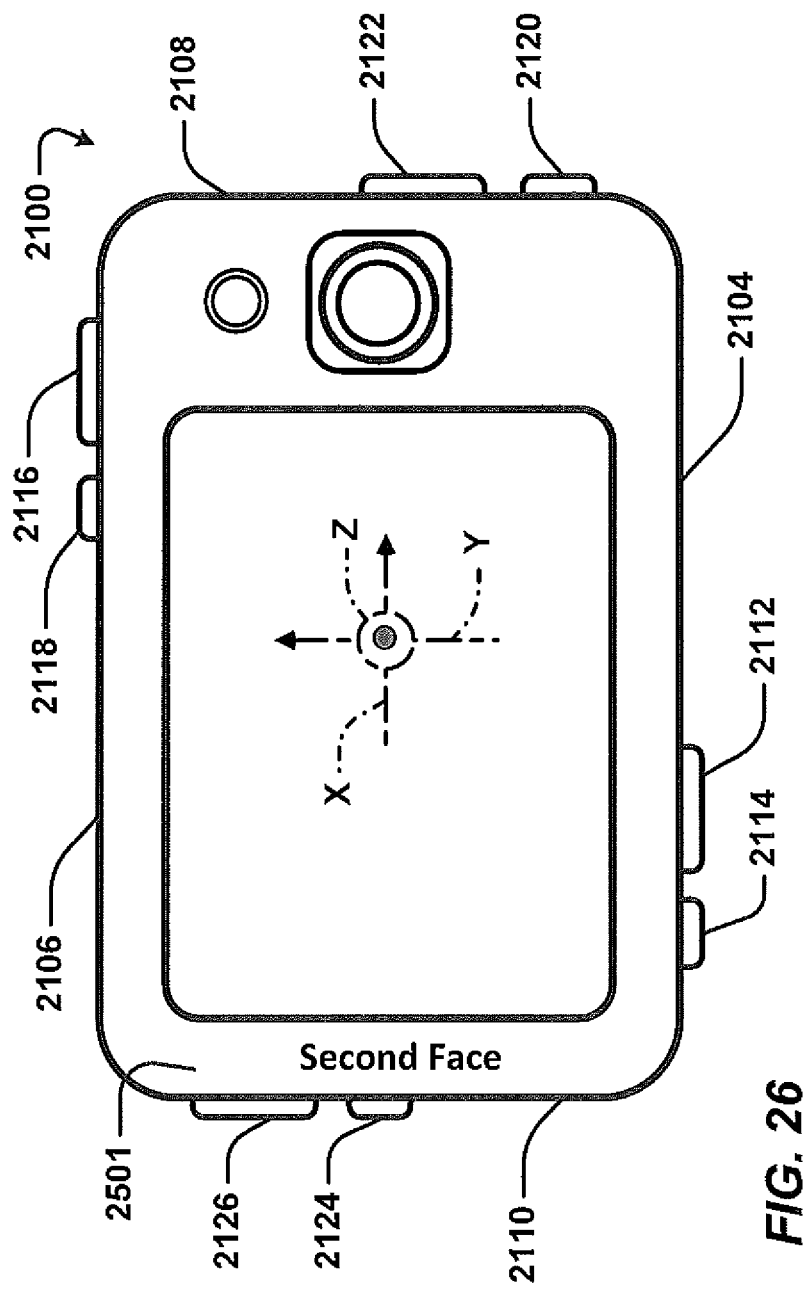
FIG. 26 illustrates the seventh example mobile communication device at a sixth orientation, being rotated 90° from the fifth orientation of FIG. 25.

As an illustrative reassignment regarding the device move from the first orientation (FIG. 21) to the third orientation (FIG. 23), the state/function assigned for the orientation of FIG. 21 to the sixth button 2122, being the larger/longer, and more-rectangular, button at the top of the device 2100 in FIG. 21, is re-mapped, with the 90° turn to the third orientation (FIG. 23), to the first button 2112, which becomes the larger/longer, and more-rectangular, button at the top of the device 2100 (FIG. 23).

Again, while state/function reassignments are described herein primarily in connection with a device turn commencing with the device being in the first position (e.g., the first position of FIGS. 1, 3, 5, 7, 10, 17, and 21), the devices are configured to execute reassignments as needed between any two device orientations. As further example of the reassigning operations, then, using the present embodiment, reassignments are made in response to the device 2100 being rotated 180° about the Y axis from the third orientation of FIG. 23 to the seventh orientation of FIG. 27.

Figure 27:
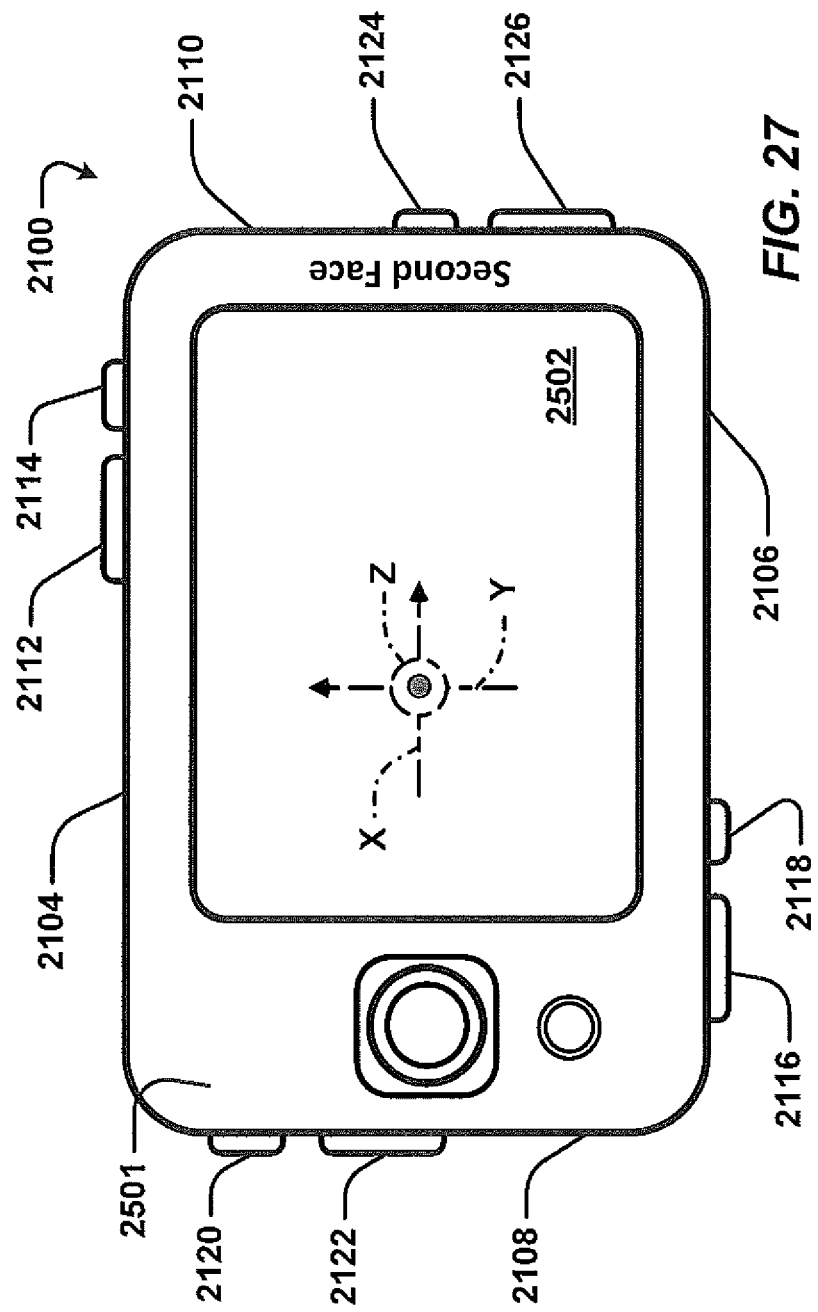
FIG. 27 illustrates the seventh example mobile communication device at a seventh orientation, being rotated 270° from the fifth orientation of FIG. 25.

As an example, a state/function assignment linked for the third orientation of FIG. 23 to the fifth button 2120, being the smaller/shorter, more-square, button at the right of the device in the view of FIG. 23, is re-mapped, with the move to the seventh orientation, to the seventh button 2124, which becomes the smaller/shorter, more-square, button at the right of the device 2100 (FIG. 27). As another example, a state/function assignment linked for the third orientation of FIG. 23 to the fourth button 2118, being the smaller/shorter, more-square, button on the bottom in the view of FIG. 23, remains with, or is temporarily linked away from and back to the fourth button 2118, which remains/becomes again the smaller/shorter, more-square, button on the bottom of the device 2100 (FIG. 27).

And again, by contemplated embodiment, a replacing button (e.g., button becoming linked to a state/function assignment linked previously, before a turn of the device, to another button) may be related to an original button (e.g., button to which the assignment was previously linked) in more than one way at a time to warrant the re-linking. The device is configured in one embodiment, for example, so that a larger/more-rectangular button on a side of the device is replaced by device rotation by an opposite-side larger/more-rectangular button, wherein each of the buttons is also the higher of two buttons on their respective sides. The software can be configured for such cases to link the function from the prior to the latter buttons based on the size, shape, and/or relative positioning relationships between the buttons.

Again, benefits described above regarding other embodiments are applicable as well to implementation of the embodiments associated with the sixth example device.

Figure 28:
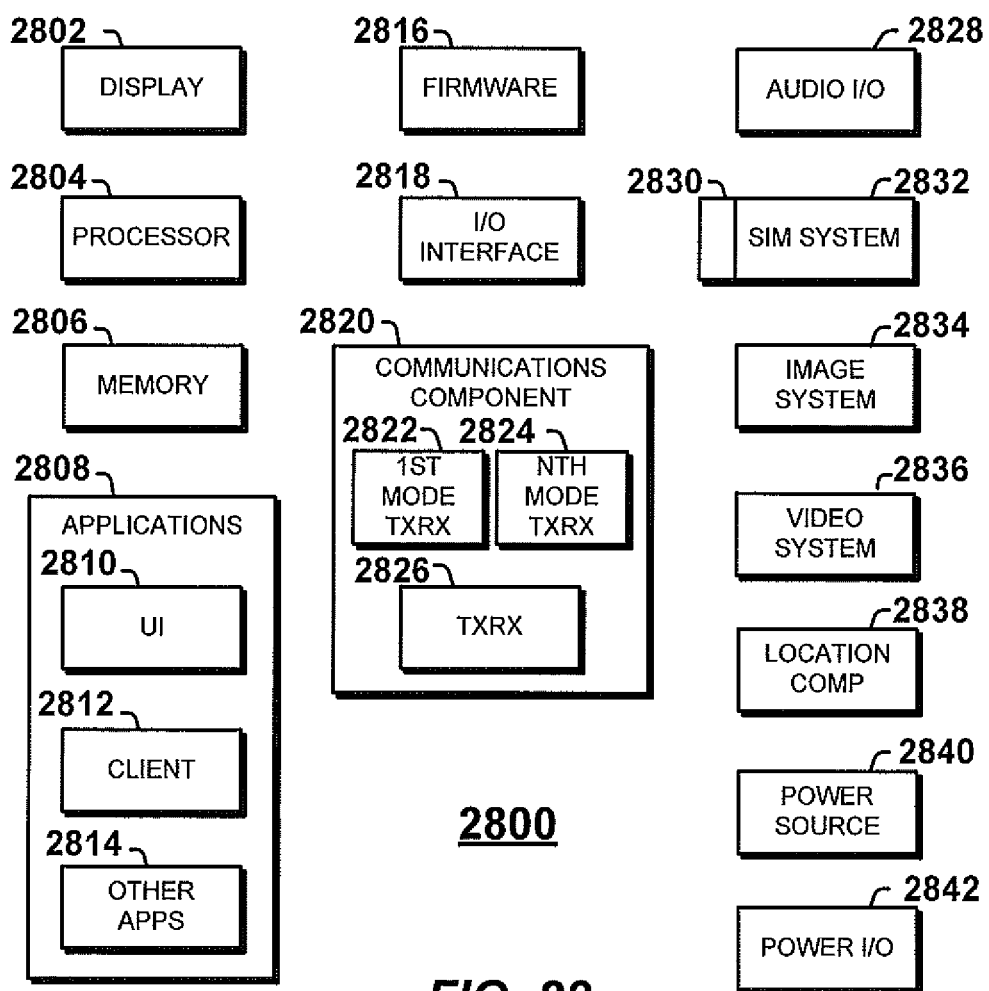
FIG. 28 illustrates schematically example components of the mobile communication devices disclosed herein.

Mobile Device Overview—FIG. 28

FIG. 28 shows schematically components of an illustrative mobile communication device 2800. The components described for the illustrative device 2800 can be used in any of the example devices described herein.

The mobile device 2800 may be, as mentioned, a smart phone, personal data assistant, tablet, similar, or other hand-held electronic device.

Although in FIG. 28 not all connections between components are shown, the components can interact with each other to carry out device functions. In some embodiments, for example, the components are arranged so as to communicate via one or more busses (not shown). It should be understood that FIG. 28 and the following description are intended to provide a general understanding of a suitable environment in which the various aspects of some embodiments of the present disclosure can be implemented.

In some embodiments, the mobile device 2800 is a multimode headset and has a variety of computer readable media, including, for example, volatile media, non-volatile media, removable media, and non-removable media. The term computer-readable media and variants thereof, as used in the specification and claims, refer to storage media or storage devices. In some embodiments, storage media includes volatile and/or non-volatile, removable, and/or non-removable media, and can be tangible or non-transitory.

For example, storage media includes random access memory (RAM), read-only memory (ROM), electrically erasable programmable read-only memory (EEPROM), solid state memory or other memory technology, CD ROM, DVD, or other optical disk storage, magnetic tape, magnetic disk storage or other magnetic storage devices, or any other medium that can be used to store the desired information and that can be accessed by the processor.

As illustrated in FIG. 28, the mobile device 2800 includes a display 2802 for displaying multimedia such as, for example, application graphical user interfaces (GUIs), text, images, video, telephony functions such as Caller ID data, setup functions, menus, music, metadata, messages, wallpaper, graphics, Internet content, device status, preferences settings, map and location data, routes and other directions, points of interest (POI), and the like.

The illustrated mobile device 2800 also includes a processor 2804 for controlling, processing data, and/or executing computer-executable instructions of one or more applications, and a memory 2806 for storing data and/or one or more applications 2808, or code or instruction sets, etc.

The processor could be multiple processors, which could include distributed processors or parallel processors in a single machine or multiple machines. The processor can be used in supporting a virtual processing environment. The processor could include a state machine, application specific integrated circuit (ASIC), programmable gate array (PGA) including a Field PGA, or state machine. References herein to processor executing code or instructions to perform operations, acts, tasks, functions, steps, or the like, could include the processor performing the operations directly and/or facilitating, directing, or cooperating with another device or component to perform the operations.

In some embodiments, the memory 2806 stores information associated with determining device orientation and change of device orientation, and maintain or re-assign state/function assignments to device buttons accordingly, per the device configurations and operations described herein.

The memory 2806 may store information including user preference factors and/or administrative factors set by an administrator, manufacturer, or service provider, which are described in more detail below.

In some embodiments, the application(s) 2808 include a user interface (UI) application 2810. The UI application 2810 interfaces with a client 2812 (e.g., an operating system (OS)) to facilitate user interaction with device functionality and data. In some embodiments, the client 2812 is one of Symbian OS® (Symbian OS is a registered trademark of Symbian Limited, of London, England), Microsoft® Windows® Mobile OS (Microsoft and Windows are registered trademarks of the Microsoft Corporation of Redmond, Wash.), Palm webOS® (Palm WebOS is a registered trademark of the Palm Trademark Holding Company, of Sunnyvale, Calif.), Palm OS® (also a registered trademark of the Palm Trademark Holding Company), RIM® BlackBerry® OS (RIM and Blackberry are registered trademarks of Research In Motion Limited of Waterloo, Ontario, Canada), Apple® iPhone® OS (Apple and iPhone are registered trademarks of the Apple Corporation, of Cupertino, Calif.), or Google Android® OS (Android is a registered trademark of Google, Inc., of Mountain View, Calif.).

These operating systems are merely examples of the operating systems that can be used in accordance with the embodiments disclosed herein. Other operating systems are contemplated.

The UI application 2810 aids the user in entering message content, viewing received messages, answering/initiating calls, entering/deleting data, entering and setting user IDs and passwords, configuring settings, manipulating address book content and/or settings, interacting with other applications 2814, and the like. In some embodiments, the other applications 2814 include, for example, add-ons, plug-ins, location applications, e-mail applications, music applications, video applications, camera applications, power conservation applications, game applications, productivity applications, entertainment applications, enterprise applications, customer information management applications, accounting applications, authentication applications, applications, proprietary business applications, combinations thereof, and the like. The applications 2808 are stored in the memory 2806 and/or in a firmware 2816, and can be executed by the processor 2804. The firmware 2816 can also store code for execution during device 2800 power up, for example.

The illustrated mobile device 2800 also includes an input/output (I/O) interface 2818 for input/output of data, such as, for example, user IDs, passwords, and application initiation (start-up) requests. In some embodiments, the I/O interface 2818 is a hardwire connection, such as, for example, a USB, mini-USB, audio jack, PS2, IEEE 1394, serial, parallel, Ethernet (RJ48) port, RJ11 port, or the like. In some embodiments, the I/O interface 2818 accepts other I/O devices such as, for example, keyboards, keypads, mice, interface tethers, stylus pens, printers, thumb drives, touch screens, multi-touch screens, touch pads, trackballs, joysticks, microphones, remote control devices, monitors, displays, liquid crystal displays (LCDs), combinations thereof, and the like. It should be appreciated that the I/O interface 2818 can be used for communications between the mobile device 2800 and a network or local device, instead of, or in addition to, a communications component 2820.

The communications component 2820 interfaces with the processor 2804 to facilitate wired/wireless communications with external systems, Example external systems include, but are not limited to, intranets, network databases, network storage systems, cellular networks, location systems, Voice over Internet Protocol (VoIP) networks, local area networks (LANs), wide area networks (WANs), metropolitan area networks (MANs), personal area networks (PANs), and other networks. In some embodiments, the external systems are implemented using WIFI, WIMAX, combinations and/or improvements thereof, and the like. In some embodiments, the communications component 2820 includes a multimode communications subsystem for providing cellular communications via different cellular technologies. In some embodiments, for example, a first cellular transceiver 2822 operates in one mode, such as, Global System for Mobile communications (GSM), and an Nth cellular transceiver 2824 operates in a different mode, such as Universal Mobile Telecommunications System (UMTS). While only two cellular transceivers 2822, 2824 are illustrated, the mobile device 2800 may include more than two transceivers.

The illustrated communications component 2820 also includes a transceiver 2826 for use by other communications technologies such as, for example, WIFI, WIMAX, BLUETOOTH, infrared, infrared data association (IRDA), near field communications (NFC), RF, and the like. In some embodiments, the communications component 2820 also facilitates reception from terrestrial radio networks, digital satellite radio networks, Internet-based radio services networks, combinations thereof, and the like. The communications component 2820 can process data from a network such as, for example, the Internet, an intranet, a home broadband network, a WIFI hotspot, and the like, via an ISP, DSL provider, or broadband provider.

In some embodiments, audio capabilities for the mobile device 2800 are provided by an audio I/O component 2828 including a speaker to output audio signals and a microphone to receive audio signals.

The illustrated mobile device 2800 also includes a slot interface 2830 for accommodating a subscriber identity system 2832 such as, for example, a subscriber identity module (SIM) card, a universal SIM (USIM) card, or a universal integrated circuit card (UICC). Alternatively, the subscriber identity system 2832 can be manufactured into the device 2800, thereby obviating the need for a slot interface 2830. In some embodiments, the subscriber identity system 2832 stores information associated with determining location of the mobile device 2800 according the methods described herein. For example, the subscriber identity system 2832 may store information including user preference factors and/or administrative factors set by an administrator, manufacturer, or service provider, which are described in more detail below. In some embodiments, the subscriber identity system 2832 is programmed by a manufacturer, a retailer, a user, a computer, a network operator, or the like.

The illustrated mobile device 2800 also includes an image capture and processing system 2834 (image system). Photos can be obtained via an associated image capture subsystem of the image system 2834, for example, a camera. The illustrated mobile device 2800 also includes a video system 2836 for capturing, processing, recording, modifying, and/or transmitting video content.

The illustrated mobile device 2800 also includes a power source 2840, such as batteries and/or other power subsystem (AC or DC). The power source 2840 can interface with an external power system or charging equipment via a power I/O component 2842.

The illustrated mobile device 2800 also includes a positioning and location component 2838 for use in determining position and location-related characteristics for the device, such as an orientation and/or a geographic location of the mobile device 2800. While one box is used schematically in FIG. 28 to indicate the component 2838, the device 2800 may include more than one component to serve the positioning and location-related functions. The location component 2838 may include, for example, a GPS receiver and an accelerometer.

Figure 29:
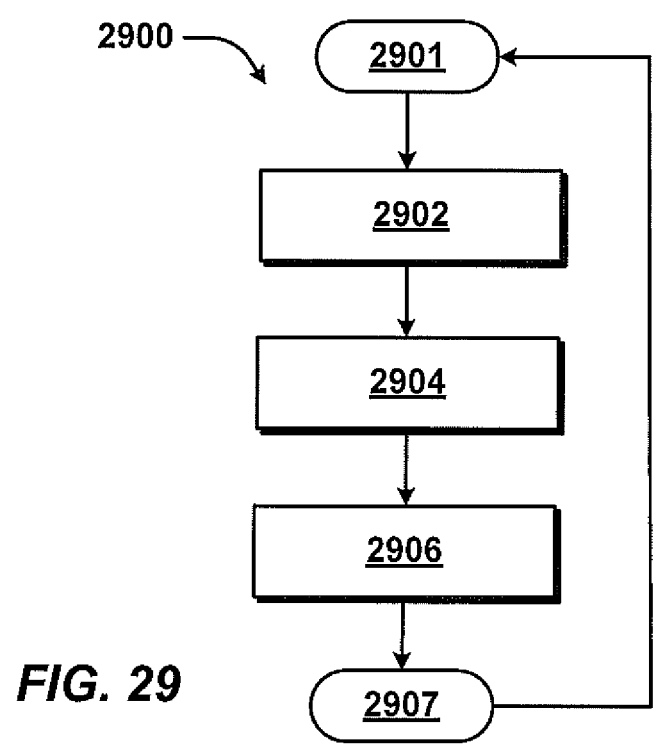
FIG. 29 illustrates example methods of operation for the mobile communication devices disclosed according to various embodiments taught herein.

Method of Operation—FIG. 29

Turning to the final figure, FIG. 29 illustrates an example method 2900 of operation. The method is performed in primary embodiments by the mobile communication devices disclosed herein.

It should be understood that the steps of the method 2900 are not necessarily presented in any particular order and that performance of some or all the steps in an alternative order is possible and is contemplated. The steps have been presented in the demonstrated order for ease of description and illustration.

Operations can be added, omitted and/or performed simultaneously without departing from the scope of the appended claims. It should also be understood that the illustrated method 2900 can be ended at any time.

In certain embodiments, some or all steps of this process, and/or substantially equivalent steps are performed by execution by a processor, such as the processor 2804, of computer-readable instructions (e.g., 2808) stored or included on a computer readable medium, such as the memory 2806 of the mobile device 2800. In a contemplated embodiment, one or more of the functions are performed at a computerized system (e.g., processor executing instruction stored an, e.g., non-transitory, computer-readable storage medium or device) remote to the device, such as determining how to reassign states/functions, based on a re-orientation detected at the device, and transmitting re-assigning instruction to the device.

The method 2900 begins 2901 and flow proceeds to block 2902, whereat a device processor, executing software of the device, determines an initial orientation of the device. The determination can be made in any of a wide variety of ways, including those described herein.

The determination in some embodiments includes receiving output from at least one device component such as an accelerometer, a visual sensor, such as a camera, or a light sensor (e.g., RADAR). As mentioned, the indication advising of the reorientation can include, e.g., an amount and direction of orientation change and/or a resulting orientation. In a contemplated embodiment in which a camera or other visual sensor is used, the communication device is configured to determine an instant orientation of the device, and so changes to device orientation, based on the data being collected by the sensor.

In a particular implementation, for example, the device is configured to recognize when a camera (e.g., a first of two device cameras) is facing a user, such as by recognizing a user face in close proximity to the camera.

As mentioned, in a contemplated embodiment in which a camera or other visual sensor is used, the communication device is configured to determine an instant orientation of the device, and so changes to device orientation, based on physical characteristics (e.g., light patterns) collected by the sensor. And a particular implementation, for example, the device is configured to recognize when a camera (e.g., a first of two device cameras) is facing a user, such as by recognizing a user face in close proximity to the camera, and in some cases also directional indications, such as which direction is a top of a users head (by detecting, e.g., where eyes are with respect to a mouth or chin, and/or by detecting a top of the head, etc.). The processor, executing the device software can determine based on such data that the device is in a certain orientation—e.g., that of FIG. 1 turned 90° or 180° degrees from the FIG. 1 orientation, or flipped from any of these orientations.

At block, 2904, the device determines a second orientation that the device has arrived at. The second orientation can be the same as the first, such as if a device is turned only momentarily away from a first orientation and then back to the first orientation.

At block 2906, the device, in response to determining that the re-orientation has occurred, re-assigns states/functions associated with at least two device buttons based on a protocol set forth by the computer-executable instructions being executed. The protocol can include one or more of (I) assigning/reassigning states/functions (or, in other words mapping/remapping or linking/re-linking state/function assignments) to buttons based on user perspective button areas (UPBAs), as described above in connection with FIGS. 1-4, (II) assigning/reassigning states/functions (or, in other words mapping/remapping or linking/re-linking state/function assignments) to buttons based on relative button positioning, as described above in connection with FIGS. 5-16, and (Ill) assigning/reassigning states/functions (or, in other words mapping/remapping or linking/re-linking state/function assignments) to buttons based on relative button sizing or shapes, as described above in connection with FIGS. 17-27.

For the first case (I), the buttons may be sized and/or shaped in a symmetrical manner about the X and Y axis, as shown in FIG. 1—e.g., the relatively-larger first button 112 at top left opposite, in the X and Y perspective, the similarly relatively-larger fourth button 118 at bottom left, and the relatively-smaller second button 114 at bottom left opposite, in the X and Y perspective, the similarly relatively-smaller third button 116 at top left.

At block 2907, the process ends, or is repeated, such as in connection with a subsequent device reorientation.

EXAMPLE ADVANTAGES AND BENEFITS

Implementing any combination of the characteristics described herein, including button arrangements, button states and functions, and automatic state and/or function reassignment operations, allows intuitive use of the devices, irrespective of whether the device is positioned in a first or second of at least two device orientations.

In these ways, after a user, who has become familiar with a particular button arrangement (e.g., certain user perspective button areas) or relationship (e.g., relative positioning, sizing, and/or shapes) for buttons in connection with a first device orientation, has rotated the handset to a second orientation, states/functions are reassigned to the buttons responsive to the reorientation and based on one of the applicable protocols described so that the user can use the buttons being tasked in generally the same manner familiar with.

The user can become accustomed comfortably with button assignments and their being generally identical no matter how the device is oriented amongst two or more select orientations.

Other benefits include allowing a user to perform functions irrespective of how the device is being held. For instance, a button at a certain position relative to the user, relative to an adjacent button, shaped or sized in a certain relative manner to an adjacent button, etc., will control the camera shutter whether the device is in a first or second orientation.

As provided, in various implementations, a user picking up a device while in the dark, or without looking at the device, or otherwise holding the device so that it ends up in any of the covered orientations, can adjust volume or initiate other operations without needing to determine whether the device is oriented in one way or another.

The user need not turn the device to move buttons to a certain position that the user is accustomed to.

CONCLUSION

Various embodiments of the present disclosure are disclosed herein. The disclosed embodiments are merely examples that may be embodied in various and alternative forms, and combinations thereof.

The law does not require and it is economically prohibitive to illustrate and teach every possible embodiment of the present claims. Hence, the above-described embodiments are merely exemplary illustrations of implementations set forth for a clear understanding of the principles of the disclosure.

Variations, modifications, and combinations may be made to the above-described embodiments without departing from the scope of the claims. All such variations, modifications, and combinations are included herein by the scope of this disclosure and the following claims.

What is claimed is:

1. A multi-orientation mobile communication device comprising:
   a body comprising a first side, a second side opposite the first side, a third side extending between the first side and the second side, and a fourth side opposite the third side and also extending between the first side and the second side;
   a first structural button positioned at the first side of the body at a first relative positioning with respect to a second structural button positioned also on the first side of the body, wherein the first structural button is associated with a first size;
   the second structural button positioned at a second relative positioning with respect to the first structural button, wherein the second structural button is associated with a second size that is smaller than the first size of the first structural button;
   a third structural button positioned at the second side of the body at the first relative positioning with respect to a fourth structural button positioned also on the second side of the body, wherein the third structural button is associated with the first size;
   the fourth structural button positioned at the second relative positioning with respect to the third structural button, wherein when the multi-orientation mobile communication device is in an initial orientation, the first side, including the first structural button and the second structural button, is in a first user-perspective button area and the second side, including the third structural button and the fourth structural button, is in a second user-perspective button area;
   a processor; and
   a computer-readable storage medium comprising computer-executable instructions that, when executed by the processor, cause the processor to perform operations comprising:
      associating a first function to the first structural button based on the first structural button being associated with the first size and being positioned, when the multi-orientation mobile communication device is in the initial orientation, in the first user-perspective button area,
      associating a second function to the second structural button based on the second structural button being associated with the second size and being positioned, when the multi-orientation mobile communication device is in the initial orientation, in the first user-perspective button area,
      associating a third function to the third structural button based on the third structural button being associated with the first size and being positioned, when the multi-orientation mobile communication device is in the initial orientation, in the second user-perspective button area,
      associating a fourth function to the fourth structural button based on the fourth structural button being associated with the second size and being positioned, when the multi-orientation mobile communication device is in the initial orientation, in the second user-perspective button area,
      determining that an orientation of the multi-orientation mobile communication device has changed from the initial orientation to a new orientation, wherein in the new orientation, the first side, including the first structural button and the second structural button, is in the second user-perspective button area, the second structural button is positioned at the first side in the second user-perspective button area at the first relative positioning with respect to the first structural button, and the first structural button is positioned at the first side in the second user-perspective button area at the second relative positioning with respect to the second structural button, wherein in the new orientation, the second side, including the third structural button and the fourth structural button, is in the first user-perspective button area, the fourth structural button is positioned at the second side in the first user-perspective button area at the first relative positioning with respect to the third structural button, and the third structural button is positioned at the second side in the first user-perspective button area at the second relative positioning with respect to the fourth structural button, and wherein determining that the orientation of the multi-orientation mobile communication device has changed from the initial orientation to the new orientation comprises using input received from an accelerometer or using input received from a camera component, and reassigning, in response to determining that the orientation has changed to the new orientation, button functions, wherein reassigning the button functions comprises associating the first function, previously associated with the first structural button, to the third structural button based on the third structural button being associated with the first size, like the first structural button, and being positioned, upon the multi-orientation mobile communication device arriving at the new orientation, in the first user-perspective button area, associating the second function, previously associated with the second structural button, to the fourth structural button based on the fourth structural button being associated with the second size, like the second structural button, and being positioned, upon the multi-orientation mobile communication device arriving at the new orientation, in the first user-perspective button area, associating the third function, previously associated with the third structural button, to the first structural button based on the first structural button begin associated with the first size, like the third structural button, and being positioned, upon the multi-orientation mobile communication device arriving at the new orientation, in the second user-perspective button area, and associating the fourth function to the second structural button based on the second structural button being associated with the second size, like the fourth structural button, and being positioned, upon the multi-orientation mobile communication device arriving at the new orientation, in the second user-perspective button area.

2. The multi-orientation mobile communication device of claim 1, wherein:
the first relative positioning comprises being positioned closer to the third side of the multi-orientation mobile communication device than the fourth side; and
the second relative positioning comprises being positioned closer to the fourth side of the multi-orientation mobile communication device than the third side.

3. The multi-orientation mobile communication device of claim 1, wherein the input received from the camera component indicates that a user face is in front of the camera component.

4. The multi-orientation mobile communication device of claim 1, further comprising:

a first device face extending between the first side and the second side and between the third side and the fourth side; and
a second device face opposite the first device face, the second device face also extending between the first side and the second side and between the third side and the fourth side, wherein the first device face is open to a device-user direction when the multi-orientation mobile communication device is at the initial orientation and the second device face is open to the device-user direction when the multi-orientation mobile communication device is at the new orientation.

5. The multi-orientation mobile communication device of claim 1, further comprising:

a fifth structural button positioned at the third side of the body at a third relative positioning with respect to a sixth structural button positioned also on the third side of the body, wherein the fifth structural button is associated with the second size;
the sixth structural button positioned at a fourth relative positioning with respect to the fifth structural button, wherein the sixth structural button is associated with the first size;
a seventh structural button positioned at the fourth side of the body at the third relative positioning with respect to an eighth structural button positioned also on the fourth side of the body, wherein the seventh structural button is associated with the second size; and
the eighth structural button positioned at the fourth relative positioning with respect to the seventh structural button, wherein the eighth structural button is associated with the first size, wherein when the multi-orientation mobile communication device is in the initial orientation, the third side, including the fifth structural button and the sixth structural button, is in a third user-perspective button area and the fourth side, including the seventh structural button and the eighth structural button, is in a fourth user-perspective button area, and wherein the operations further comprise associating a fifth function to the fifth structural button based on the fifth structural button being associated with the second size and being positioned, when the multi-orientation mobile communication device is in the initial orientation, in the third user-perspective button area, associating a sixth function to the sixth structural button based on the sixth structural button being associated with the first size and being positioned, when the multi-orientation mobile communication device is in the initial orientation, in the third user-perspective button area, associating a seventh function to the seventh structural button based on the seventh structural button being associated with the second size and being positioned, when the multi-orientation mobile communication device is in the initial orientation, in the fourth user-perspective button area, and associating an eighth function to the eighth structural button based on the eighth structural button being associated with the first size and being positioned, when the multi-orientation mobile communication device is in the initial orientation, in the fourth user-perspective button area, and in response to determining that the orientation of the multi-orientation mobile communication device has changed from the initial orientation to the new orientation, determining that in the new orientation, the third side, including the fifth structural button and the sixth structural button, is in the fourth user-perspective button area, the sixth structural button is positioned at the third side in the fourth user-perspective button area at the third relative positioning with respect to the fifth structural button, and the fifth structural button is positioned at the third side in the fourth user-perspective button area at the fourth relative positioning with respect to the sixth structural button, and further determining that in the new orientation, the fourth side, including the seventh structural button and the eighth structural button, is in the third user-perspective button area, the eighth structural button is positioned at the fourth side in the third user-perspective button area at the third relative positioning with respect to the seventh structural button, and the seventh structural button is positioned at the fourth side in the third user-perspective button area at the fourth relative positioning with respect to the eighth structural button, wherein reassigning the button functions further comprises associating the fifth function, previously associated with the fifth structural button, to the seventh structural button based on the seventh structural button being associated with the second size and being positioned, upon the multi-orientation mobile communication device arriving at the new orientation, in the third user-perspective button area, associating the sixth function, previously associated with the sixth structural button, to the eighth structural button based on the eighth structural button being associated with the first size and being positioned, upon the multi-orientation mobile communication device arriving at the new orientation, in the third user-perspective button area, associating the seventh function, previously associated with the seventh structural button, to the fifth structural button based on the fifth structural button being associated with the second size and being positioned, upon the multi-orientation mobile communication device arriving at the new orientation, in the fourth user-perspective button area, and associating the eighth function to the sixth structural button based on the sixth structural button being associated with the first size and being positioned, upon the multi-orientation mobile communication device arriving at the new orientation, in the fourth user-perspective button area.

6. The multi-orientation mobile communication device of claim 5, wherein:

the third relative positioning comprises being positioned closer to the first side of the multi-orientation mobile communication device than the second side; and the fourth relative positioning comprises being positioned closer to the second side of the multi-orientation mobile communication device than the first side.

7. A non-transitory computer-readable storage medium storing instructions that, when executed by a processor of a mobile communication device, cause the processor to perform operations comprising:

associating a first function to a first structural button of the mobile communication device based on the first structural button being associated with a first size and being positioned, when the mobile communication device is in an initial orientation, in a first user-perspective button area, wherein the mobile communication device comprises a body comprising a first side, a second side opposite the first side, a third side extending between the first side and the second side, and a fourth side opposite the third side and also extending between the first side and the second side, the first structural button positioned at the first side of the body at a first relative positioning with respect to a second structural button positioned also on the first side of the body, wherein the first structural button is associated with the first size, the second structural button positioned at a second relative positioning with respect to the first structural button, wherein the second structural button is associated with a second size that is smaller than the first size of the first structural button, a third structural button positioned at the second side of the body at the first relative positioning with respect to a fourth structural button positioned also on the second side of the body, wherein the third structural button is associated with the first size, and the fourth structural button positioned at the second relative positioning with respect to the third structural button, wherein when the mobile communication device is in the initial orientation, the first side, including the first structural button and the second structural button, is in the first user-perspective button area and the second side, including the third structural button and the fourth structural button, is in a second user-perspective button area;

associating a second function to the second structural button based on the second structural button being associated with the second size and being positioned, when the mobile communication device is in the initial orientation, in the first user-perspective button area;

associating a third function to the third structural button based on the third structural button being associated with the first size and being positioned, when the mobile communication device is in the initial orientation, in the second user-perspective button area;

associating a fourth function to the fourth structural button based on the fourth structural button being associated with the second size and being positioned, when the mobile communication device is in the initial orientation, in the second user-perspective button area;

determining that an orientation of the mobile communication device has changed from the initial orientation to a new orientation, wherein in the new orientation, the first side, including the first structural button and the second structural button, is in the second user-perspective button area, the second structural button is positioned at the first side in the second user-perspective button area at the first relative positioning with respect to the first structural button, and the first structural button is positioned at the first side in the second user-perspective button area at the second relative positioning with respect to the second structural button, wherein in the new orientation, the second side, including the third structural button and the fourth structural button, is in the first user-perspective button area, the fourth structural button is positioned at the second side in the first user-perspective button area at the first relative positioning with respect to the third structural button, and the third structural button is positioned at the second side in the first user-perspective button area at the second relative positioning with respect to the fourth structural button, and wherein determining that the orientation of the mobile communication device has changed from the initial orientation to the new orientation comprises using input received from an accelerometer or using input received from a camera component; and reassigning, in response to determining that the orientation has changed to the new orientation, button functions, wherein reassigning the button functions comprises associating the first function, previously associated with the first structural button, to the third structural button based on the third structural button being associated with the first size, like the first structural button, and being positioned, upon the mobile communication device arriving at the new orientation, in the first user-perspective button area, associating the second function, previously associated with the second structural button, to the fourth structural button based on the fourth structural button being associated with the second size, like the second structural button, and being positioned, upon the mobile communication device arriving at the new orientation, in the first user-perspective button area, associating the third function, previously associated with the third structural button, to the first structural button based on the first structural button begin associated with the first size, like the third structural button, and being positioned, upon the mobile communication device arriving at the new orientation, in the second user-perspective button area, and associating the fourth function to the second structural button based on the second structural button being associated with the second size, like the fourth structural button, and being positioned, upon the mobile communication device arriving at the new orientation, in the second user-perspective button area.

8. The non-transitory computer-readable storage medium of claim 7, wherein the first relative positioning comprises being positioned closer to the third side of the mobile communication device than the fourth side and the second relative positioning comprises being positioned closer to the fourth side of the mobile communication device than the third side.

9. The non-transitory computer-readable storage medium of claim 7, wherein the input received from the camera component indicates that a user face is in front of the camera component.

10. The non-transitory computer-readable storage medium of claim 7, wherein the mobile communication device further comprises:

a first device face extending between the first side and the second side and between the third side and the fourth side; and a second device face opposite the first device face, the second device face also extending between the first side and the second side and between the third side and the fourth side, wherein the first device face is open to a device-user direction when the device is at the initial orientation and the second device face is open to the device-user direction when the device is at the new orientation.

11. The non-transitory computer-readable storage medium of claim 7, wherein the mobile communication device further comprises:

a fifth structural button positioned at the third side of the body at a third relative positioning with respect to a sixth structural button positioned also on the third side of the body, wherein the fifth structural button is associated with the second size;

the sixth structural button positioned at a fourth relative positioning with respect to the fifth structural button, wherein the sixth structural button is associated with the first size;

a seventh structural button positioned at the fourth side of the body at the third relative positioning with respect to an eighth structural button positioned also on the fourth side of the body, wherein the seventh structural button is associated with the second size; and the eighth structural button positioned at the fourth relative positioning with respect to the seventh structural button, wherein the eighth structural button is associated with the first size, wherein when the mobile communication device is in the initial orientation, the third side, including the fifth structural button and the sixth structural button, is in a third user-perspective button area and the fourth side, including the seventh structural button and the eighth structural button, is in a fourth user-perspective button area, and wherein the operations further comprise:

associating a fifth function to the fifth structural button based on the fifth structural button being associated with the second size and being positioned, when the mobile communication device is in the initial orientation, in the third user-perspective button area, associating a sixth function to the sixth structural button based on the sixth structural button being associated with the first size and being positioned, when the mobile communication device is in the initial orientation, in the third user-perspective button area, associating a seventh function to the seventh structural button based on the seventh structural button being associated with the second size and being positioned, when the mobile communication device is in the initial orientation, in the fourth user-perspective button area, and associating an eighth function to the eighth structural button based on the eighth structural button being associated with the first size and being positioned, when the mobile communication device is in the initial orientation, in the fourth user-perspective button area, and in response to determining that the orientation of the multi-orientation mobile communication device has changed from the initial orientation to the new orientation, determining that in the new orientation, the third side, including the fifth structural button and the sixth structural button, is in the fourth user-perspective button area, the sixth structural button is positioned at the third side in the fourth user-perspective button area at the third relative positioning with respect to the fifth structural button, and the fifth structural button is positioned at the third side in the fourth user-perspective button area at the fourth relative positioning with respect to the sixth structural button, and further determining that in the new orientation, the fourth side, including the seventh structural button and the eighth structural button, is in the third user-perspective button area, the eighth structural button is positioned at the fourth side in the third user-perspective button area at the third relative positioning with respect to the seventh structural button, and the seventh structural button is positioned at the fourth side in the third user-perspective button area at the fourth relative positioning with respect to the eighth structural button, wherein reassigning the button functions further comprises associating the fifth function, previously associated with the fifth structural button, to the seventh structural button based on the seventh structural button being associated with the second size and being positioned, upon the mobile communication device arriving at the new orientation, in the third user-perspective button area, associating the sixth function, previously associated with the sixth structural button, to the eighth structural button based on the eighth structural button being associated with the first size and being positioned, upon the mobile communication device arriving at the new orientation, in the third user-perspective button area, associating the seventh function, previously associated with the seventh structural button, to the fifth structural button based on the fifth structural button being associated with the second size and being positioned, upon the mobile communication device arriving at the new orientation, in the fourth user-perspective button area, and associating the eighth function to the sixth structural button based on the sixth structural button being associated with the first size and being positioned, upon the mobile communication device arriving at the new orientation, in the fourth user-perspective button area.

12. A method comprising:

associating, by a mobile communication device comprising a processor, a first function to a first structural button of the mobile communication device based on the first structural button being associated with a first size and being positioned, when the mobile communication device is in an initial orientation, in a first user-perspective button area, wherein the mobile communication device comprises a body comprising a first side, a second side opposite the first side, a third side extending between the first side and the second side, and a fourth side opposite the third side and also extending between the first side and the second side, the first structural button positioned at the first side of the body at a first relative positioning with respect to a second structural button positioned also on the first side of the body, wherein the first structural button is associated with the first size, the second structural button positioned at a second relative positioning with respect to the first structural button, wherein the second structural button is associated with a second size that is smaller than the first size of the first structural button, a third structural button positioned at the second side of the body at the first relative positioning with respect to a fourth structural button positioned also on the second side of the body, wherein the third structural button is associated with the first size, and the fourth structural button positioned at the second relative positioning with respect to the third structural button, wherein when the mobile communication device is in the initial orientation, the first side, including the first structural button and the second structural button, is in the first user-perspective button area and the second side, including the third structural button and the fourth structural button, is in a second user-perspective button area;

associating, by the mobile communication device, a second function to the second structural button based on the second structural button being associated with the second size and being positioned, when the mobile communication device is in the initial orientation, in the first user-perspective button area;

associating, by the mobile communication device, a third function to the third structural button based on the third structural button being associated with the first size and being positioned, when the mobile communication device is in the initial orientation, in the second user-perspective button area;

associating, by the mobile communication device, a fourth function to the fourth structural button based on the fourth structural button being associated with the second size and being positioned, when the mobile communication device is in the initial orientation, in the second user-perspective button area;

determining, by the mobile communication device, that an orientation of the mobile communication device has changed from the initial orientation to a new orientation, wherein in the new orientation, the first side, including the first structural button and the second structural button, is in the second user-perspective button area, the second structural button is positioned at the first side in the second user-perspective button area at the first relative positioning with respect to the first structural button, and the first structural button is positioned at the first side in the second user-perspective button area at the second relative positioning with respect to the second structural button, wherein in the new orientation, the second side, including the third structural button and the fourth structural button, is in the first user-perspective button area, the fourth structural button is positioned at the second side in the first user-perspective button area at the first relative positioning with respect to the third structural button, and the third structural button is positioned at the second side in the first user-perspective button area at the second relative positioning with respect to the fourth structural button, and wherein determining that the orientation of the mobile communication device has changed from the initial orientation to the new orientation comprises using input received from an accelerometer or using input received from a camera component; and reassigning, by the mobile communication device, in response to determining that the orientation has changed to the new orientation, button functions, wherein reassigning the button functions comprises associating, by the mobile communication device, the first function, previously associated with the first structural button, to the third structural button based on the third structural button being associated with the first size, like the first structural button, and being positioned, upon the mobile communication device arriving at the new orientation, in the first user-perspective button area, associating, by the mobile communication device, the second function, previously associated with the second structural button, to the fourth structural button based on the fourth structural button being associated with the second size, like the second structural button, and being positioned, upon the mobile communication device arriving at the new orientation, in the first user-perspective button area, associating, by the mobile communication device, the third function, previously associated with the third structural button, to the first structural button based on the first structural button begin associated with the first size, like the third structural button, and being positioned, upon the mobile communication device arriving at the new orientation, in the second user-perspective button area, and associating, by the mobile communication device, the fourth function to the second structural button based on the second structural button being associated with the second size, like the fourth structural button, and being positioned, upon the mobile communication device arriving at the new orientation, in the second user-perspective button area.

13. The method of claim 12, wherein the first relative positioning comprises being positioned closer to the third side of the mobile communication device than the fourth side and the second relative positioning comprises being positioned closer to the fourth side of the mobile communication device than the third side.

14. The method of claim 12, wherein the input received from the camera component indicates that a user face is in front of the camera component.

* * * * *